(12) United States Patent
Yamashita

(10) Patent No.: US 9,712,737 B2
(45) Date of Patent: Jul. 18, 2017

(54) CAMERA CONTROL METHOD USABLE ONLY BY USER PRESENT IN PHOTOGRAPHING SPOT

(71) Applicant: Panasonic Intellectual Property Management Co., Ltd., Osaka (JP)

(72) Inventor: Kazuhiko Yamashita, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/075,108

(22) Filed: Mar. 19, 2016

(65) Prior Publication Data
US 2016/0295092 A1 Oct. 6, 2016

(30) Foreign Application Priority Data
Mar. 30, 2015 (JP) ................. 2015-068114

(51) Int. Cl.
*H04N 5/232* (2006.01)
*G06K 9/00* (2006.01)
*H04N 7/18* (2006.01)

(52) U.S. Cl.
CPC ..... *H04N 5/23203* (2013.01); *G06K 9/00369* (2013.01); *G06K 9/00771* (2013.01); *H04N 7/183* (2013.01)

(58) Field of Classification Search
CPC ............... H04N 5/23203; H04N 7/183; G06K 9/00369; G06K 9/00771
See application file for complete search history.

(56) References Cited

U.S. PATENT DOCUMENTS

| 8,799,088 B2 * | 8/2014 | Rothschild | G06Q 20/04 235/380 |
| 2003/0039380 A1 * | 2/2003 | Sukegawa | G06K 9/6255 382/118 |
| 2004/0099731 A1 * | 5/2004 | Olenick | G07F 17/26 235/380 |

FOREIGN PATENT DOCUMENTS

| JP | 11-215421 | 8/1999 |
| JP | 2004-361464 | 12/2004 |
| JP | 2014-099763 | 5/2014 |

* cited by examiner

*Primary Examiner* — Mekonnen Dagnew
(74) *Attorney, Agent, or Firm* — Greenblum & Bernstein, P.L.C.

(57) ABSTRACT

A request to issue a photographing ID is received from a user and a first photographing ID is generated. The first photographing ID is issued from an ID issuer installed in a photographing spot. When a second photographing ID is received from a mobile terminal of the user, the first photographing ID is collated with the second photographing ID. When the collated photographing IDs are identical, a transmission source of the second photographing ID is authenticated as being present in the photographing spot. In accordance with an instruction from the authenticated transmission source of the second photographing ID, a photographing camera installed toward the photographing spot is controlled.

22 Claims, 21 Drawing Sheets

FIG. 7A  01/01/2015 12:34:56

FIG. 7B  42f851980045ecacbd27a38c01573a24

FIG. 7C  http://camerasystem/42f851980045ecacbd27a38c01573a24

FIG. 13A

| TABLE ID | CAMERA ID | ISSUED PHOTOGRAPHING ID | USER ID |
|---|---|---|---|
| T001 | C001 | | |
| T002 | C001 | | |
| T003 | C001 | | |

FIG. 13B

| TABLE ID | CAMERA ID | ISSUED PHOTOGRAPHING ID | USER ID |
|---|---|---|---|
| T001 | C001 | | |
| T002 | C001 | e10abc3949ba59abbe56 e057f20f883e | |
| T003 | C001 | | |

FIG. 13C

| TABLE ID | CAMERA ID | ISSUED PHOTOGRAPHING ID | USER ID |
|---|---|---|---|
| T001 | C001 | | |
| T002 | C001 | | U001 |
| T003 | C001 | | |

FIG. 13D

| TABLE ID | CAMERA ID | ISSUED PHOTOGRAPHING ID | USER ID |
|---|---|---|---|
| T001 | C001 | f1887d3f9e6ee7a32fe5e 76f4ab80d63 | |
| T002 | C001 | | U001 |
| T003 | C001 | | |

FIG. 13E

| TABLE ID | CAMERA ID | ISSUED PHOTOGRAPHING ID | USER ID |
|---|---|---|---|
| T001 | C001 | | U001 |
| T002 | C001 | | U001 |
| T003 | C001 | | |

FIG. 15A  123456

FIG. 15B  e10adc3949ba59abbe56e057f20f883e

FIG. 15C  http://camerasystem/e10adc3949ba59abbe56e057f20f883e

| TABLE ID | CAMERA ID | ISSUED PHOTOGRAPHING ID | USER ID |
|---|---|---|---|
| T001 | C001 | | |
| T002 | C001 | | |
| T002 | C002 | | |
| T003 | C002 | | |

CAMERA CONTROL METHOD USABLE ONLY BY USER PRESENT IN PHOTOGRAPHING SPOT

BACKGROUND

1. Technical Field

The present disclosure relates to a camera control method for performing photographing using a remote controllable camera installed in a photographing spot such as a tourist spot and a restaurant.

2. Description of the Related Art

A service is considered that installs a camera in a place where a user desires to be photographed as a part of a subject such as a place with a nice view in a tourist spot or a theme park (hereinafter, referred to as a "photographing spot") and provides the user with photographing using the installed camera. With this service, the user is provided with a more beautiful photograph without blur, compared with when the user performs photographing with his or her own camera or the like, whereby user satisfaction is increased.

As an example of a system achieving a service as described above, an operation terminal (remote controller, for example) is rented out to a user so that the user can cause an installed camera to take a photograph in accordance with an instruction from the operation terminal (see, for example, Japanese Unexamined Patent Application Publication No. 11-215421).

Furthermore, a service is known that registers in advance a phone number of a user's mobile phone, for example, and when an access is made from the registered phone number, allows the corresponding mobile phone to perform remote control of a camera (see, for example, Japanese Unexamined Patent Application Publication No. 2004-361464).

A service as described above is preferably not used by a third person, who has no connection with the user present in the photographing spot, in view of the protection of privacy.

From this background, a method is known with which a face shot of a user is registered in advance, and only when it is authenticated that the person in the registered face shot and the person seen in the installed camera are the same person, the service is provided (see, for example, Japanese Unexamined Patent Application Publication No. 2014-099763).

SUMMARY

One non-limiting and exemplary embodiment provides a camera control method and a camera control system usable only by a user present in a photographing spot, with which a face shot of a user does not have to be registered in advance.

In one general aspect, the techniques disclosed here feature a camera control method used in a photographing system including an ID issuer installed in a photographing spot, a photographing camera installed toward the photographing spot, and a communicator for performing data communication with an external terminal. The camera control method includes generating a first photographing ID by receiving a request to issue a photographing ID, issuing the first photographing ID from the ID issuer, receiving a second photographing ID at the communicator, authenticating that a transmission source of the second photographing ID is present in the photographing spot when the first photographing ID is collated with the second photographing ID and the collated IDs are identical, and controlling the photographing camera in accordance with an instruction from the transmission source of the second photographing ID authenticated by the authenticating.

With the configuration described above, photographing using the photographing camera can be allowed only to a person who can know the photographing ID issued by the ID issuer installed in the photographing spot, that is, the user present in the photographing spot.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

It should be noted that general or specific embodiments may be implemented as a device, a method, a system, an integrated circuit, a computer program, or a storage medium such as a computer readable CD-ROM, or any selective combination thereof.

BRIEF DESCRIPTION OF THE DRAWINGS

FIG. 7A is a diagram explaining the photographing ID generation processing and illustrating a current time;

FIG. 7B is a diagram explaining the photographing ID generation processing and illustrating a hashed character string;

FIG. 7C is a diagram explaining the photographing ID generation processing and illustrating a URL-converted character string;

FIG. 13A is a diagram illustrating an example of an authentication list;

FIG. 13B is a diagram illustrating an example of the authentication list;

FIG. 13C is a diagram illustrating an example of the authentication list;

FIG. 13D is a diagram illustrating an example of the authentication list;

FIG. 13E is a diagram illustrating an example of the authentication list;

FIG. 15A is a diagram explaining the photographing ID generation processing and illustrating a current time;

FIG. 15B is a diagram explaining the photographing ID generation processing and illustrating a hashed character string;

FIG. 15C is a diagram explaining the photographing ID generation processing and illustrating a URL-converted character string;

DETAILED DESCRIPTION

Each of the embodiments described below represents a specific example according to the present disclosure. Numerical values, shapes, components, steps, the order of steps, and the like presented in the embodiments described below are merely examples and not intended to limit the present disclosure.

<1. First Embodiment>

A remote photographing system 1 according to an embodiment of the present disclosure will be described below with reference to the drawings.

The remote photographing system 1 is a system that lets a user use a photographing camera installed in a photographing spot in a place such as a tourist spot, a theme park, and a restaurant to provide a service of taking a photograph satisfying the user. In the present embodiment, a case will be described as an example where a meal scene of a user is photographed with a restaurant table serving as a photographing spot.

<1-1. Outline>

Figure 1:
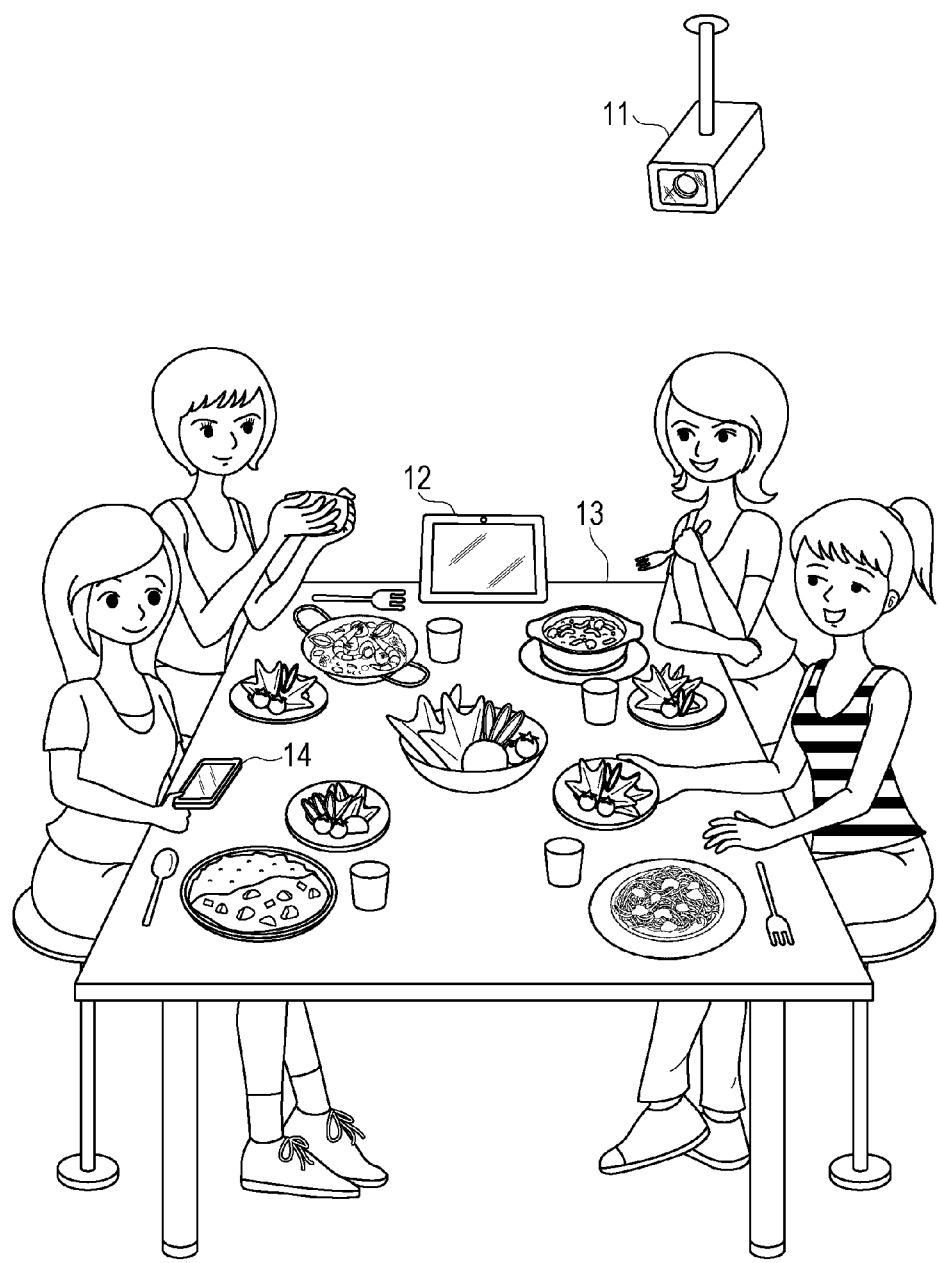
FIG. 1 is a diagram illustrating an example of a scene of using a remote photographing system.

FIG. 1 is a diagram illustrating a scene of using a remote photographing system 1. In FIG. 1, a reference numeral 11 represents a photographing camera, a reference numeral 12 represents a photographing ID issuer, a reference numeral 13 represents a table serving as a photographing spot, and a reference numeral 14 represents a mobile terminal.

As illustrated in FIG. 1, the photographing camera 11 is installed toward the table 13 serving as a photographing spot (such that the table 13 is included in a photographing range). Furthermore, the photographing ID issuer 12 is installed on the table 13 serving as a photographing spot, and at least one of the users sitting at the table 13 has a mobile terminal 14.

The photographing ID issuer 12 in the present embodiment uses a tablet terminal having a display for displaying a photographing ID. The mobile terminal 14 in the present embodiment is a mobile terminal with a camera such as a smart phone, in which a QR Code® reader application capable of reading a QR Code® and a web browser application are installed. These applications may be applications dedicated for the remote photographing system 1 or generally-distributed applications.

The remote photographing system 1 authenticates that a user attempting to use the photographing camera 11 is present in a photographing spot and the authenticated user uses the photographing camera 11 to perform photographing, with the following procedures. In the present embodiment, photographing performed with these procedures is referred to as authenticated photographing.

Figure 2A:
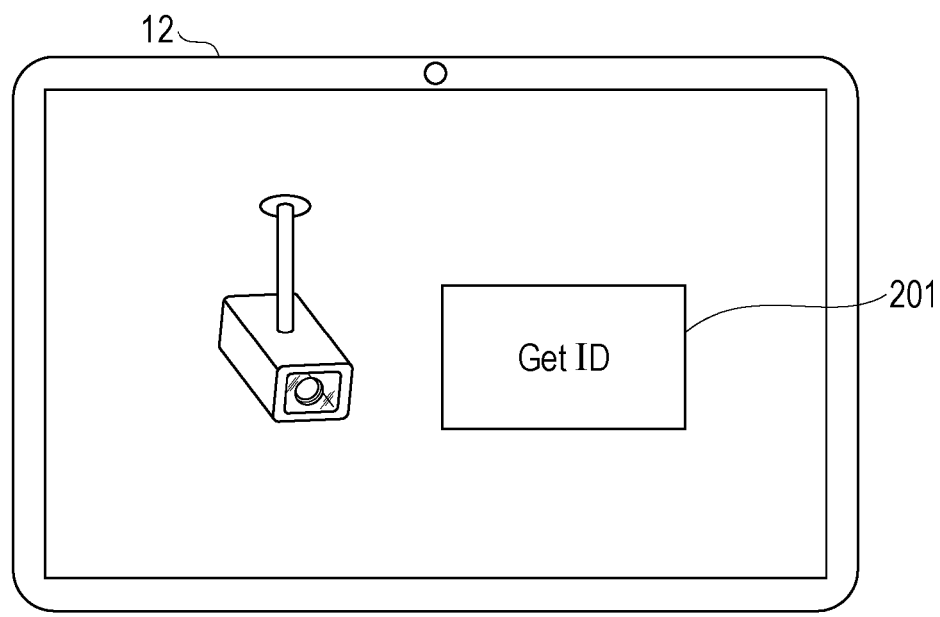
FIG. 2A is a diagram illustrating an example of a photographing guide screen.

The user using the photographing camera 11 operates the photographing ID issuer 12 to issue a photographing ID. When the user sits at the table, a photographing guide screen illustrated in FIG. 2A is displayed on the photographing ID issuer 12. A reference numeral 201 represents an icon for requesting a photographing ID. With the user touching this icon, the photographing ID issuer 12 displays a photographing ID screen illustrated in FIG. 2B. In the present embodiment, a photographing ID is converted into a QR Code® to be displayed.

When the user sits at the table 13, any other screen such as a guide or a menu of the restaurant may be displayed so that the user can change to the photographing guide screen illustrated in FIG. 2A by touching a predetermined icon.

The photographing ID converted into a QR Code® is read by a QR Code® reader application of the mobile terminal 14 to be acknowledged as a uniform resource locator (URL). This URL includes a host name of the remote photographing system 1 and a character string for ID, which becomes a different value every time a photographing ID is issued.

With this character string for ID set to a different value every time, it is controlled such that a photographing ID acquired at the table 13 in the past cannot be used to operate the photographing camera 11.

The user accesses the acknowledged URL with a web browser of the mobile terminal 14, and thereby is authenticated as being present within the photographing range of the photographing camera 11, given photographing authority to take a photograph with the photographing camera 11 the photographing range of which is the table 13. The user thus can take a photograph of his or her meal scene.

Figure 3A:
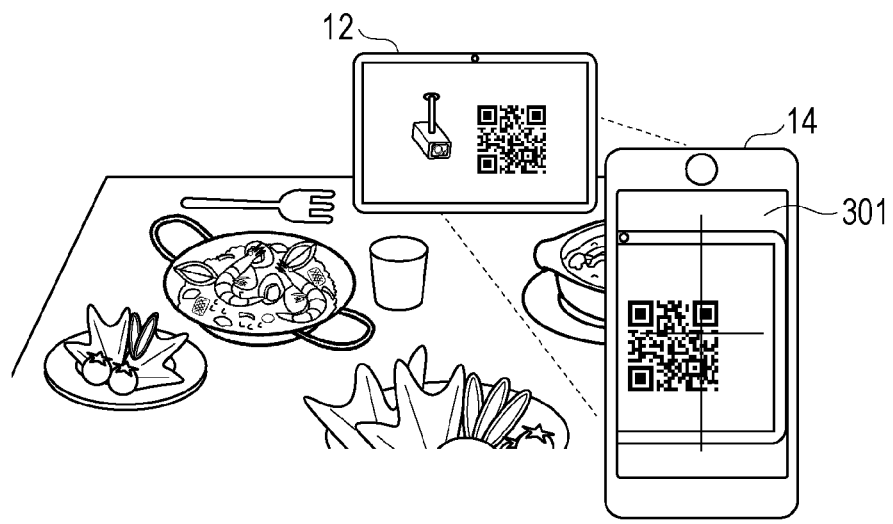
FIG. 3A is a diagram illustrating an operation of reading a QR Code® displayed on a photographing ID issuer.

FIG. 3A illustrates a state in which the QR Code® displayed on the photographing ID issuer 12 is being read by the QR Code® reader application of the mobile terminal 14. A reference numeral 301 represents screen display of the QR Code® reader application. In FIG. 3A, an image being photographed with a camera of the mobile terminal 14 is displayed. By taking the image using the camera of the mobile terminal 14 such that the QR Code® displayed on the photographing ID issuer 12 falls in this image, the URL serving as the photographing ID is read.

Figure 3B:
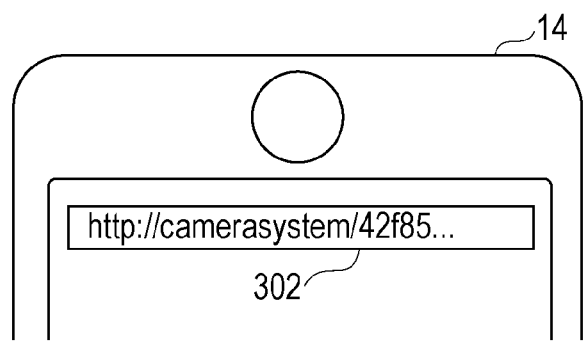
FIG. 3B is a diagram illustrating an example of a photographing ID input screen.

FIG. 3B illustrates a state in which the URL read by the QR Code® reader application is being input in an address field of the web browser application of the mobile terminal 14. A reference numeral 302 represents the read URL. The mobile terminal 14 generally has a function that enables an automatic input of a URL read by the QR Code® reader application in an address field of the web browser application.

Figure 3C:
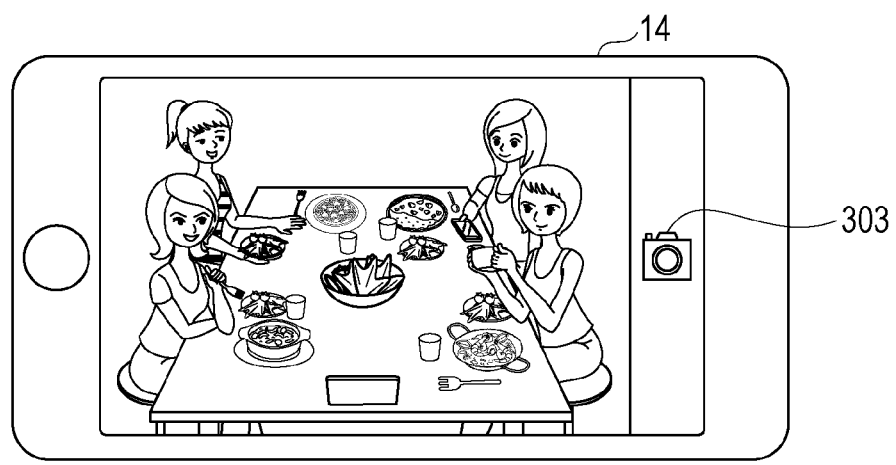
FIG. 3C is a diagram illustrating an example of screen display at the time of remote photographing.

FIG. 3C illustrates a state in which a photographing image being photographed with the photographing camera 11 is displayed by the web browser application of the mobile terminal 14. The user can obtain a photograph of the meal scene taken with the photographing camera 11 by touching a photographing button 303 while seeing the image displayed on the screen of the mobile terminal 14.

When the user transmits the photographing ID to another person present in a distant place by e-mail or the like, it becomes possible for a person who is not the user sitting at the table to perform photographing using the photographing camera 11. However, even in that case, because the user having transmitted the photographing ID is in the subject, it is impossible for a third person who has not acquired the photographing ID to use the photographing ID for surreptitious photographing, for example.

<1-2. Configuration>

A configuration of the remote photographing system 1 will next be described.

Figure 4:
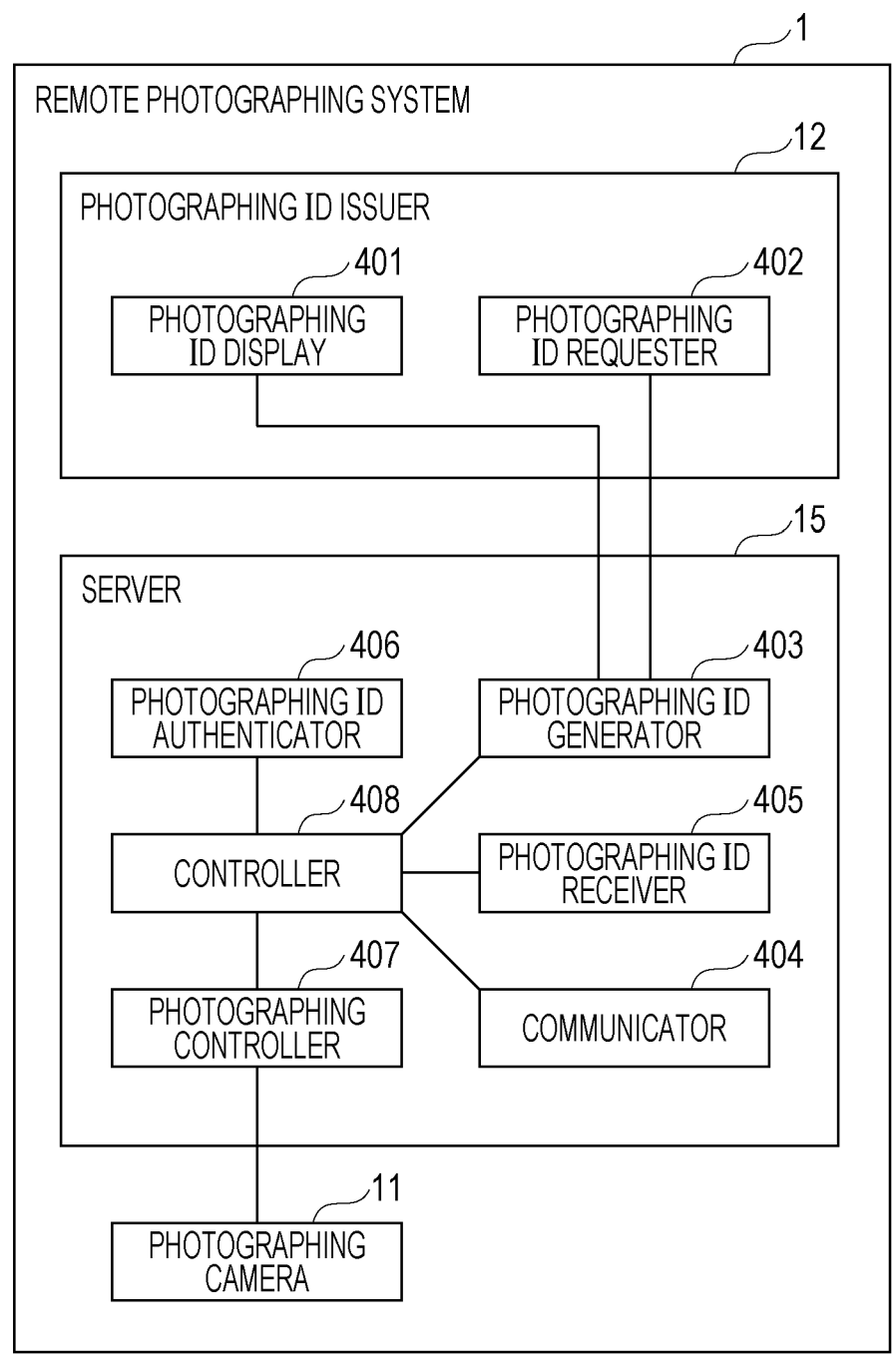
FIG. 4 is a diagram illustrating an example of a functional configuration of a remote photographing system.

FIG. 4 is a block diagram illustrating a functional configuration of the remote photographing system 1. As illustrated in FIG. 4, the remote photographing system 1 includes the photographing camera 11, the photographing ID issuer 12, and a server 15.

The photographing camera 11 is connected with the server 15 through wired or wireless connection and has a function of transmitting a photographing image to the server 15 and a function of adjusting a view angle and a focus of the photographing image under the control of the server 15, for example.

The photographing ID issuer 12 in the remote photographing system 1 is a tablet terminal including a touch screen (display with a touch sensor) installed on the table 13. In recent years, many restaurants present a menu using a tablet terminal. A tablet terminal for presenting a menu as described above can be used to implement the photographing ID issuer 12. The photographing ID issuer 12 includes a photographing ID display 401 and a photographing ID requester 402. Furthermore, the photographing ID issuer 12 is connected with the server 15 through wired or wireless connection and has a function of transmitting a photographing ID issue request received at the photographing ID requester 402 to the server 15 and a function of causing the photographing ID display 401 to display the photographing ID converted into a QR Code®, which has been received from the server 15.

Figure 2B:
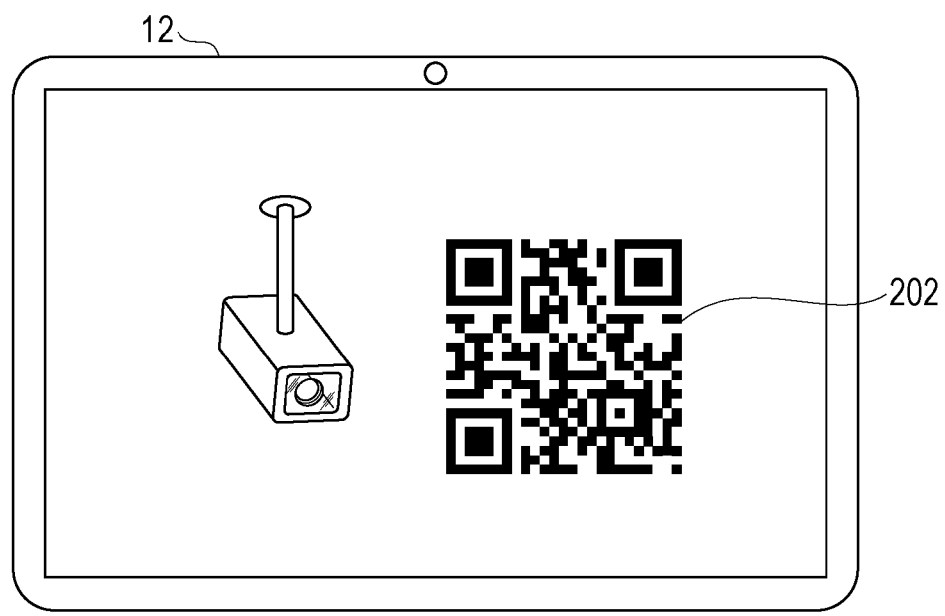
FIG. 2B is a diagram illustrating an example of a photographing ID screen.

The photographing ID display 401 is a display of the photographing ID issuer 12 and displays the icon 201 for requesting a photographing ID illustrated in FIG. 2A, a photographing ID 202 having been converted into a QR Code® illustrated in FIG. 2B, for example. The photographing ID requester 402 is a function that receives a request to issue a new photographing ID and, in the remote photographing system 1, is implemented when the icon 201 is displayed on the photographing ID display 401 and the touch sensor detects that the icon 201 is touched, as illustrated in FIG. 2A.

The server 15 includes a photographing ID generator 403, a communicator 404, a photographing ID receiver 405, a photographing ID authenticator 406, a photographing controller 407, and a controller 408.

The photographing ID generator 403 has a function of generating a new photographing ID every time the photographing ID generator 403 receives the received request to issue a photographing ID from the photographing ID issuer 12. The generated photographing ID is transmitted by the photographing ID issuer 12 and presented to the user.

The communicator 404 is an interface for the remote photographing system 1 to perform communication with the outside thereof. For example, the communicator 404 is connected with the mobile terminal 14 through a network such as the Internet to perform transmission and reception of various types of data.

The photographing ID receiver 405 receives the photographing ID from the mobile terminal 14 of the user through the communicator 404.

The photographing ID authenticator 406 collates the photographing ID generated by the photographing ID generator 403 of the remote photographing system 1 with the photographing ID received by the photographing ID receiver 405.

When the collated photographing IDs are identical, the photographing ID authenticator 406 authenticates the transmission source of the photographing ID received by the photographing ID receiver 405.

The photographing controller 407 has a function of controlling the photographing camera 11 based on an instruction received from the authenticated transmission source through the communicator 404.

The controller 408 functions with a processor executing a program stored in a memory and controls each of the function units described above.

<1-3. Operation>

An operation performed by the remote photographing system 1 will next be described.

<1-3-1. Authenticated Photographing Processing>

Figure 5:
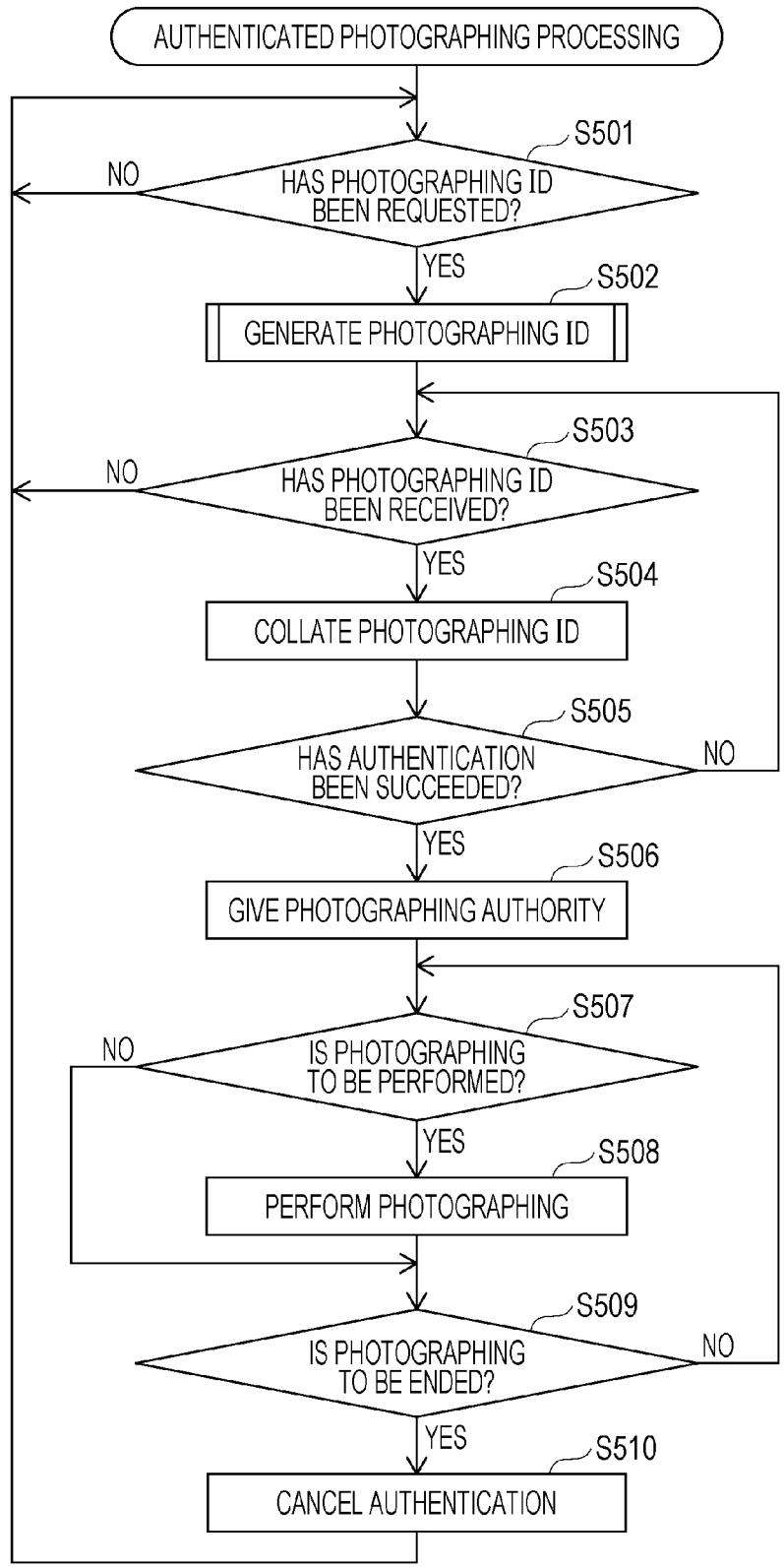
FIG. 5 is a flowchart illustrating an example of authenticated photographing processing.

FIG. 5 is a flowchart illustrating an example of procedures in authenticated photographing processing performed by the remote photographing system 1.

When the authenticated photographing processing is started, the remote photographing system 1 waits until the user performs an operation of requesting the photographing ID issuer 12 to issue a photographing ID (step S501).

When the photographing ID requester 402 receives the request to issue a new photographing ID from the user, the photographing ID generator 403 performs photographing ID generation processing which will be described later and causes the photographing ID display 401 to display the generated photographing ID (step S502).

The remote photographing system 1 then waits for a predetermined period of time until the photographing ID is received by the photographing ID receiver 405 through the communicator 404 (step S503).

The server 15 functions as a web server for the user, so that the user accesses a website of the remote photographing system 1 through the Internet.

The photographing ID receiver 405 acquires the photographing ID (access URL) from the user through the communicator 404 and forwards a character string for ID included in the URL to the photographing ID authenticator 406.

When the remote photographing system 1 has not received the photographing ID in the predetermined period of time, the remote photographing system 1 invalidates the photographing ID generated at step S502 and returns to step S501. More specifically, as long as the time difference between the generation time of the photographing ID generated at the photographing ID generator 403 and the reception time of the photographing ID received at the photographing ID receiver 405 is within the predetermined period of time, the remote photographing system 1 proceeds to step S504.

The photographing ID authenticator 406 collates the photographing ID generated at the photographing ID generator 403 with the character string for ID received from the photographing ID receiver 405 (step S504).

The photographing ID authenticator 406 determines whether the authentication of the photographing ID has been succeeded in accordance with a collation result at step S504 (step S505).

When the collation result indicates coincidence, the photographing ID authenticator 406 determines that the authentication of the photographing ID has been succeeded and proceeds to step S506. By contrast, when the collation result at step S504 indicates discrepancy, the photographing ID authenticator 406 determines that the authentication of the photographing ID has been failed and returns to step S503.

When the authentication of the photographing ID has been succeeded, the photographing ID authenticator 406 determines that the transmission source of the URL is present in the photographing spot in which the photographing ID issuer 12 is located and gives photographing authority for performing photographing using the photographing camera 11 to the mobile terminal 14 of the user serving as the transmission source of the URL (step S506).

The photographing controller 407 receives instructions from the mobile terminal 14 having been given the photographing authority through the communicator 404 (step S507). The instructions from the mobile terminal 14 having been given the photographing authority include a photographing instruction, an acquisition instruction of a preview image, a photographing end instruction, and the like. Furthermore, the instructions from the mobile terminal 14 having been given the photographing authority may include an instruction to perform a function of the photographing camera 11 such as panning, tilting, zooming, and focusing.

The photographing controller 407 controls the photographing camera 11 in accordance with the received instructions (step S508). When the photographing controller 407 receives a photographing instruction, the photographing controller 407 controls the photographing camera 11 to acquire a still image and transmits the acquired still image to the mobile terminal 14 of the user through the communicator 404. When the photographing controller 407 receives an acquisition instruction of a preview image, the photographing controller 407 controls the photographing camera 11 to acquire a preview image (moving image or still image) and transmits the acquired preview image to the mobile terminal 14 of the user through the communicator 404. With this configuration, the user of the mobile terminal 14 can check an angle and other conditions and make photographing instructions while seeing the received preview image.

Furthermore, when the photographing controller 407 receives an instruction to perform a function of the photographing camera 11, the photographing controller 407 controls the photographing camera 11 to perform the function such as panning, tilting, zooming, and focusing in accordance with the received instruction. It should be noted that the photographing controller 407 does not accept an instruction to change a photographing range of the photographing camera 11 to outside a predetermined photographable range. With this configuration, only within the predetermined photographable range, a close-up photograph of persons and meals can be taken.

When the remote photographing system 1 has not received an instruction from the mobile terminal 14 having been given the photographing authority for a predetermined period of time (one second, for example), has completed the control of the photographing camera 11 in accordance with the received instruction, or has received a photographing end instruction, the remote photographing system 1 determines whether a photographing end condition is satisfied (step S509).

In the present embodiment, the photographing end condition is that at least one of the following is satisfied: a photographing end instruction has been received from the mobile terminal 14 having been given the photographing authority; and a predetermined period of time has elapsed after the photographing authority is given to the mobile terminal 14. A predetermined period of time here is defined as a period of time around 30 seconds or one minute, for example, which is required for a photographing operation. When the defined period of time has elapsed, the photographing is forcibly ended even if a photographing end instruction is not received. With this configuration, surreptitious photographing of a person who next sits the table is prevented after the user having the mobile terminal 14 having been given the photographing authority has left the table.

When the photographing end condition is satisfied, cancel of authentication is performed. That is to say, the photographing authority given to the mobile terminal 14 is canceled (step S510). More specifically, transmission of preview images to the mobile terminal 14 is stopped and instructions from the mobile terminal 14 are not received any more. After the cancel of authentication, the processing returns to step S501 to respond to the next start of use.

When the photographing end condition is not satisfied, the processing returns to step S507.

The authenticated photographing processing performed by the remote photographing system 1 has been described above.

<1-3-2. Photographing ID Generation Processing>

Photographing ID generation processing performed by the remote photographing system 1 will next be described.

Figure 6:
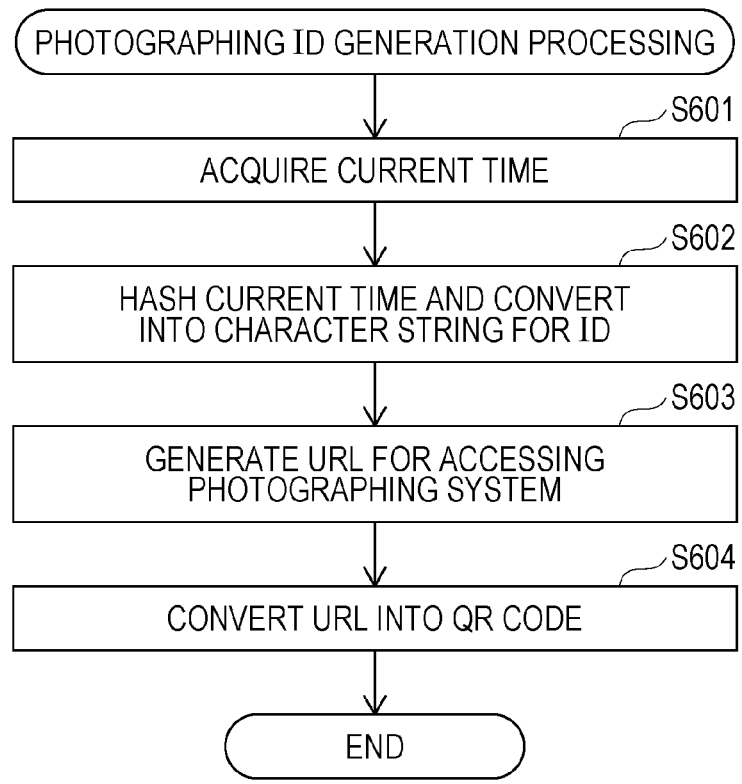
FIG. 6 is a flowchart illustrating an example of photographing ID generation processing.

FIG. 6 is a flowchart illustrating an example of photographing ID generation processing.

When the photographing ID generation processing is started, the photographing ID generator 403 acquires a current time (step S601). For example, as illustrated in FIG.

7A, "01/01/2015 12:34:56", that is, "12:34:56, January 1, 2015" is acquired as the current time. The current time may be acquired by using a clock embedded in the remote photographing system 1, or a current time that can be acquired through the Internet may be used. Including the current time in the photographing ID enables generation of a different photographing ID from photographing IDs issued in the past.

Next, the acquired current time is converted into a character string for ID using a hash function (step S602). FIG. 7B illustrates an example of a current time converted into a character string for ID using a hash function. When a character string for a current time is included as is in a photographing ID, the photographing ID can be easily guessed, whereby the system has a risk of being used for surreptitious photographing, for example. For this reason, a hash function is used for the conversion to prevent the photographing ID from being easily guessed. For the hash function used here, a perfect hash function has to be used with which, when a different current time is input, a different hash value is always generated. To further enhance safety, a cryptographic hash function is desirably used. Detailed description of a hash function is herein omitted because many literatures and algorithms therefor are disclosed.

Next, a URL of a website of the remote photographing system 1 is generated in a manner including a character string for ID (step S603). FIG. 7C is an example of a URL of a website of the remote photographing system 1. The part described as "camerasystem" in FIG. 7C is a host name of a web server of the remote photographing system 1. The character string of "42f851980045ecacbd27a38c01573a24" behind that part is the character string for ID described above.

Figure 7D:
FIG. 7D is a diagram explaining the photographing ID generation processing and illustrating a QR Code®.

Finally, the URL is converted into a QR Code® (step S604). FIG. 7D is an example of a URL having been converted into a QR Code®. A QR Code® is a matrix type two-dimensional bar code, for which many reading applications are available to be used in mobile terminals. Detailed description of a method of converting a character string such as a URL into a QR Code® is herein omitted because many literatures and algorithms therefor are disclosed.

The generated QR Code® is displayed on the photographing ID display 401 of the photographing ID issuer 12.

<1-4. Effect>

According to the present embodiment, only when the user having the mobile terminal 14 can acquire the photographing ID from the photographing ID issuer 12 installed on the table 13 serving as the photographing spot, the user is considered as being present in the photographing spot, that is, the photographing range of the photographing camera 11 and given photographing authority. This also can prevent behaviors such as surreptitious photographing from a remote place, which is conducted by a third person who is not present in the photographing spot.

<2. Second Embodiment>

A remote photographing system 2 according to an embodiment of the present disclosure will next be described with reference to the drawings. The same components as those in the remote photographing system 1 according to the first embodiment are provided with the same reference numerals and descriptions thereof will be omitted.

As in the description of the remote photographing system 1, a case will be described as an example where a meal scene of a user is photographed with a restaurant table serving as a photographing spot.

<2-1. Outline>

The remote photographing system 2 is a configuration suitable for photographing with which people at a plurality of tables in a party, for example, are collectively photographed compared with the remote photographing system 1.

Figure 8A:
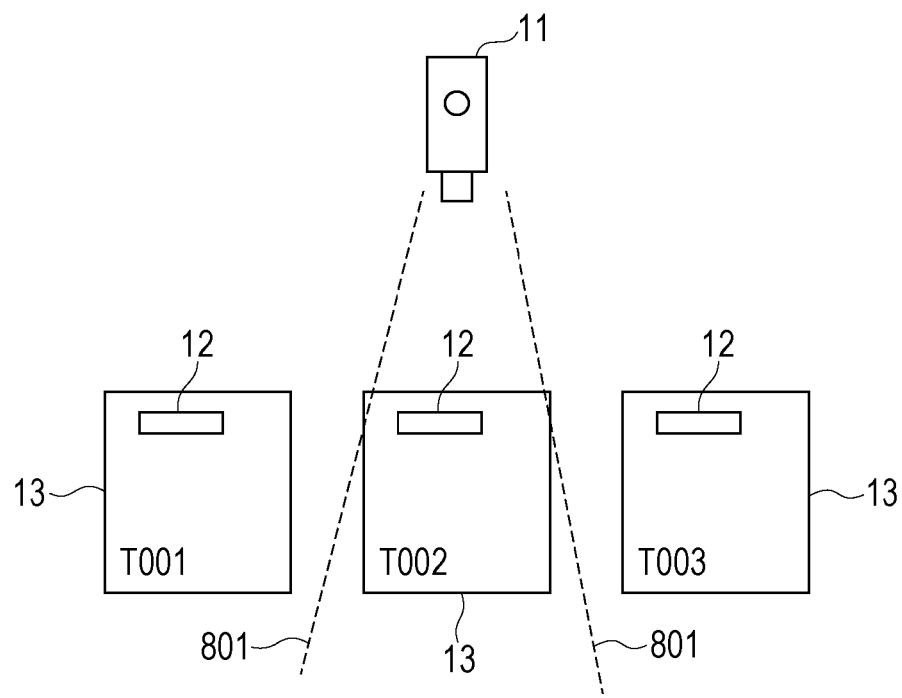
FIG. 8A is a diagram illustrating an example of a photographing range of a photographing camera at the time of one-table photographing.
Figure 8B:
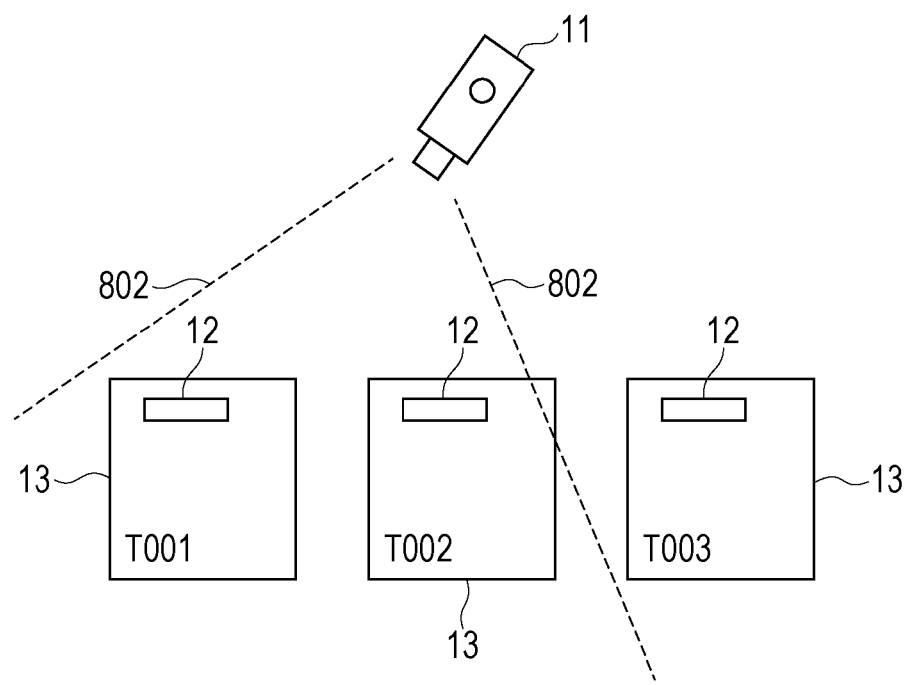
FIG. 8B is a diagram illustrating an example of a photographing range of the photographing camera at the time of two-table photographing.

FIGS. 8A and 8B are diagrams illustrating examples of photographing ranges of the photographing camera 11 in the remote photographing system 2.

On each of the tables in FIGS. 8A and 8B, a photographing ID issuer 12 is installed, as in the table illustrated in FIG. 1. Furthermore, the tables are assigned with table IDs, which are "T001" to "T003" for the sake of the convenience.

Figure 9A:
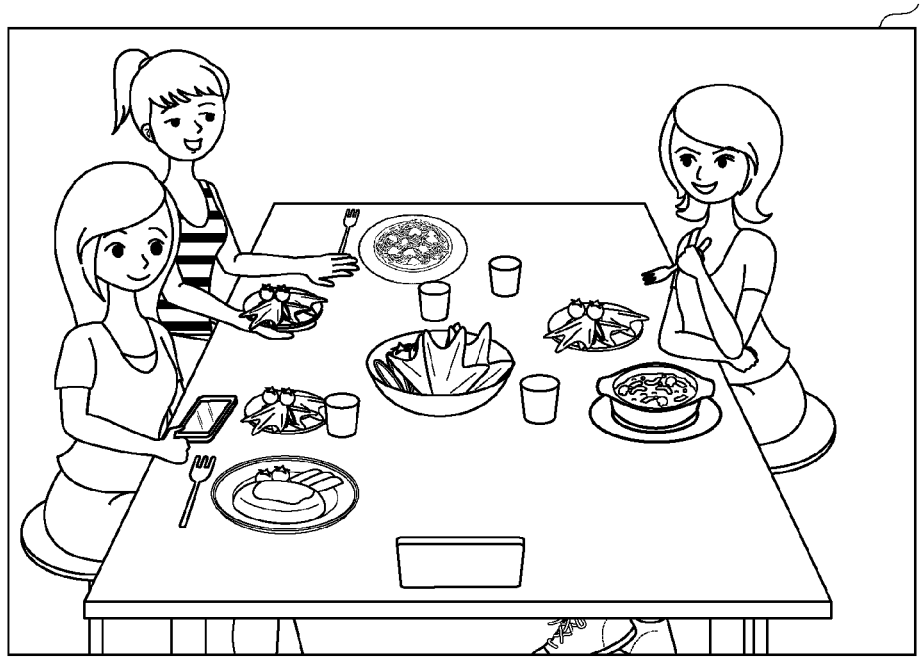
FIG. 9A is a diagram illustrating an example of a photographing image of the remote photographing system at the time of one-table photographing.

In FIG. 8A, a reference numeral 801 represents a photographing range of the photographing camera 11. In this example, only the table the table ID of which is "T002" is in the photographing range, and the tables the table IDs of which are "T001" and "T003" are out of the photographing range. An image 901 illustrated in FIG. 9A is an example of a still image photographed with the photographing camera 11 when the photographing range of the photographing camera 11 is as in FIG. 8A.

Figure 9B:
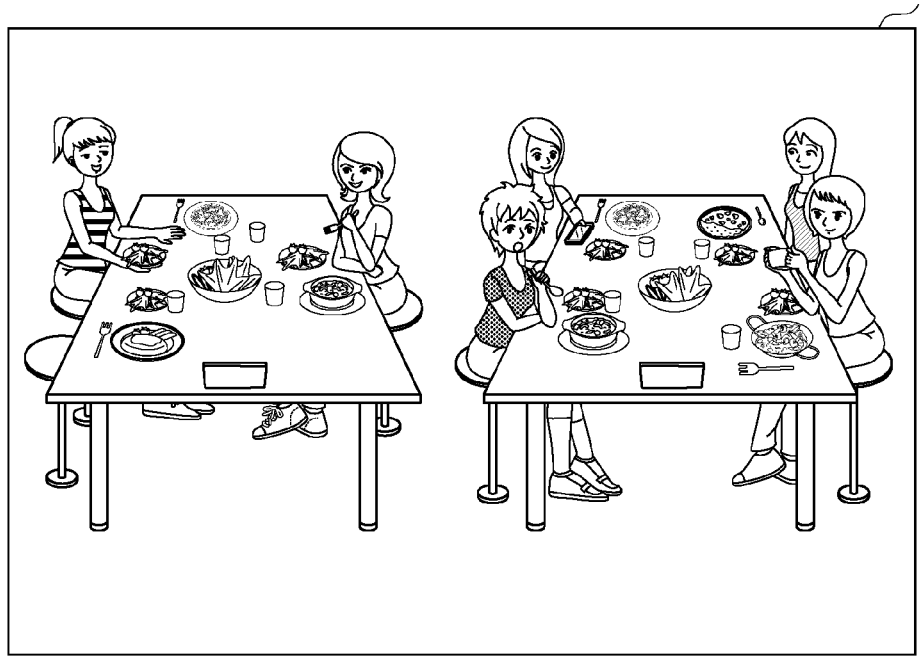
FIG. 9B is a diagram illustrating an example of a photographing image of the remote photographing system at the time of two-table photographing.

In FIG. 8B, a reference numeral 802 represents a photographing range of the photographing camera 11. In this example, the tables the table IDs of which are "T001" and "T002" are in the photographing range, and the table the table ID of which is "T003" is out of the photographing range. An image 902 illustrated in FIG. 9B is an example of a still image photographed with the photographing camera 11 when the photographing range of the photographing camera 11 is as in FIG. 8B.

Change of the photographing range from FIG. 8A to FIG. 8B is implemented by using a function included in the photographing camera 11, such as panning, tilting, and zooming.

Procedures of authenticated photographing performed by the remote photographing system 2 will be described below.

A user using the photographing camera 11 selects one table, for example, the table the table ID of which is "T002", from a plurality of tables 13 that are desired to be in a photographing range. Thereafter, with respect to the photographing ID issuer 12 installed on the selected table, the same operation as in the first embodiment is performed for authentication of a photographing ID, so that photographing authority of the photographing camera 11 is acquired.

In the remote photographing system 2, before a predetermined period of time has elapsed after authentication of a photographing ID is succeeded for one table, authentication of a photographing ID for another table desired to be in the photographing range is performed on the photographing ID issuer 12 on that table, with the same operation as described above. For example, in a state in which authentication of a photographing ID issued by the photographing ID issuer 12 on the table the table ID of which is "T002" is succeeded, authentication of a photographing ID issued by the photographing ID issuer 12 on the table the table ID of which is "T001" is performed.

In the remote photographing system 2, with the mobile terminal 14 that has succeeded in authentication of the photographing ID issued by the photographing ID issuer 12 on the one table, when authentication of the photographing ID issued by the photographing ID issuer 12 on the another table adjacent to the one table is succeeded, the photographable range of the photographing camera 11 is changed such that those tables are included in the photographable range. For example, with the mobile terminal 14 that has succeeded in authentication of the photographing ID issued by the photographing ID issuer 12 on the table the table ID of which is "T002", when authentication of the photographing ID issued by the photographing ID issuer 12 on the table the table ID of which is "T001" is succeeded, the photographable range of the photographing camera 11 is changed such that both of the table the table ID of which is "T001" and the table the table ID of which is "T002" are included in the photographable range.

Thereafter, with the same operation as in the first embodiment, control of the photographing camera 11 is performed. These procedures enable collective photographing of a plurality of tables, as illustrated in FIG. 9B.

<2-2. Configuration>

A configuration of the remote photographing system 2 will next be described.

Figure 10:
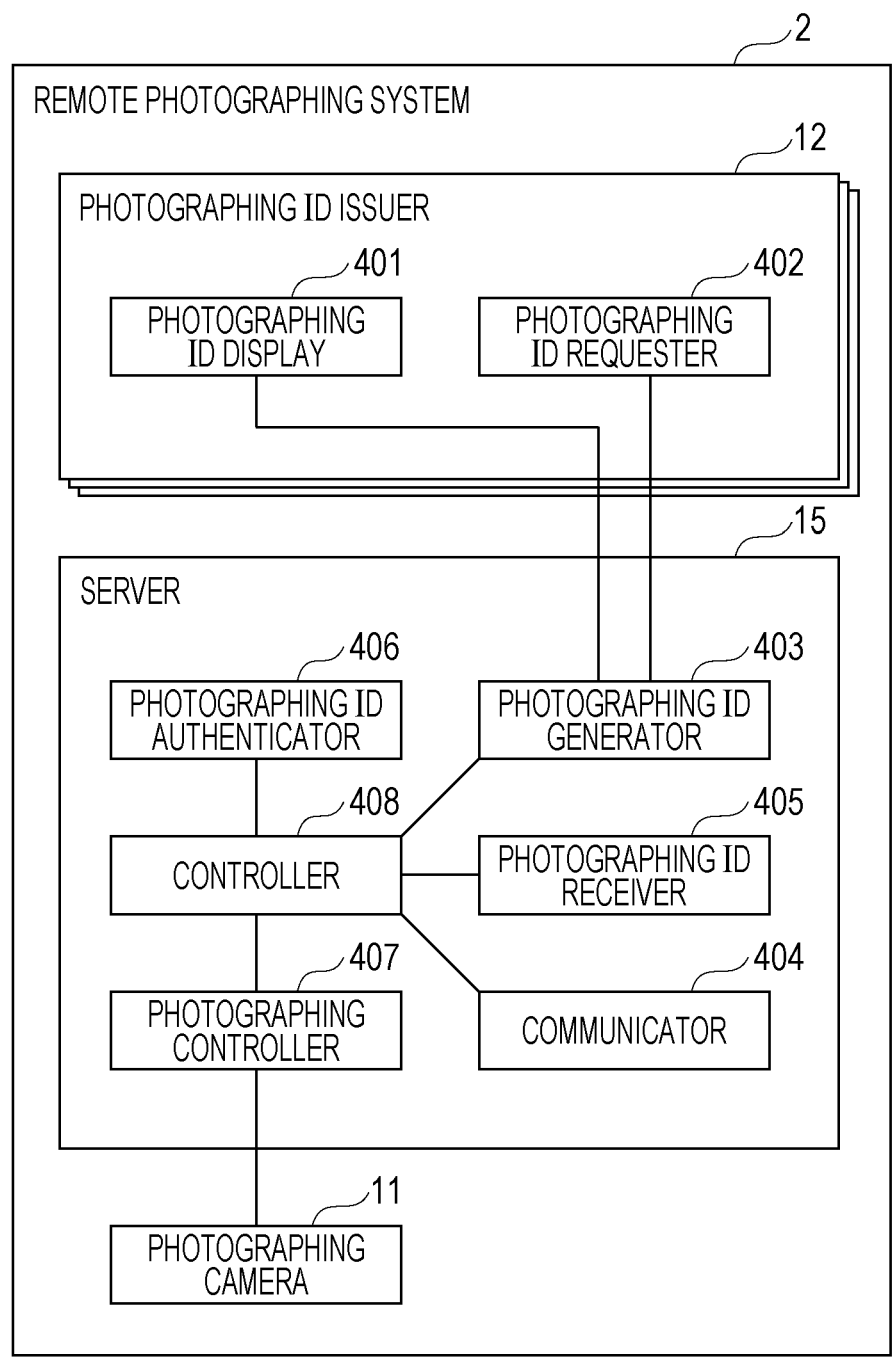
FIG. 10 is a diagram illustrating an example of a functional configuration of the remote photographing system.

FIG. 10 is a block diagram illustrating a functional configuration of the remote photographing system 2. As illustrated in FIG. 10, the remote photographing system 2 includes a photographing camera 11, a plurality of photographing ID issuers 12 each of which is installed on a table, and a server 15.

The photographing camera 11, the photographing ID issuers 12 installed on the tables, and the server 15 have the same functions as in the first embodiment.

Furthermore, to enable collective photographing of a plurality of tables, the server 15 manages an authentication list indicating the relation among the tables 13 serving as photographing spots, the photographing camera 11, photographing IDs that have been issued, and the mobile terminal 14 that has been authenticated.

The authenticated list will be described later.

<2-3. Operation>

An operation performed by the remote photographing system 2 will next be described.

<2-3-1. Authenticated Photographing Processing>

Figure 11:
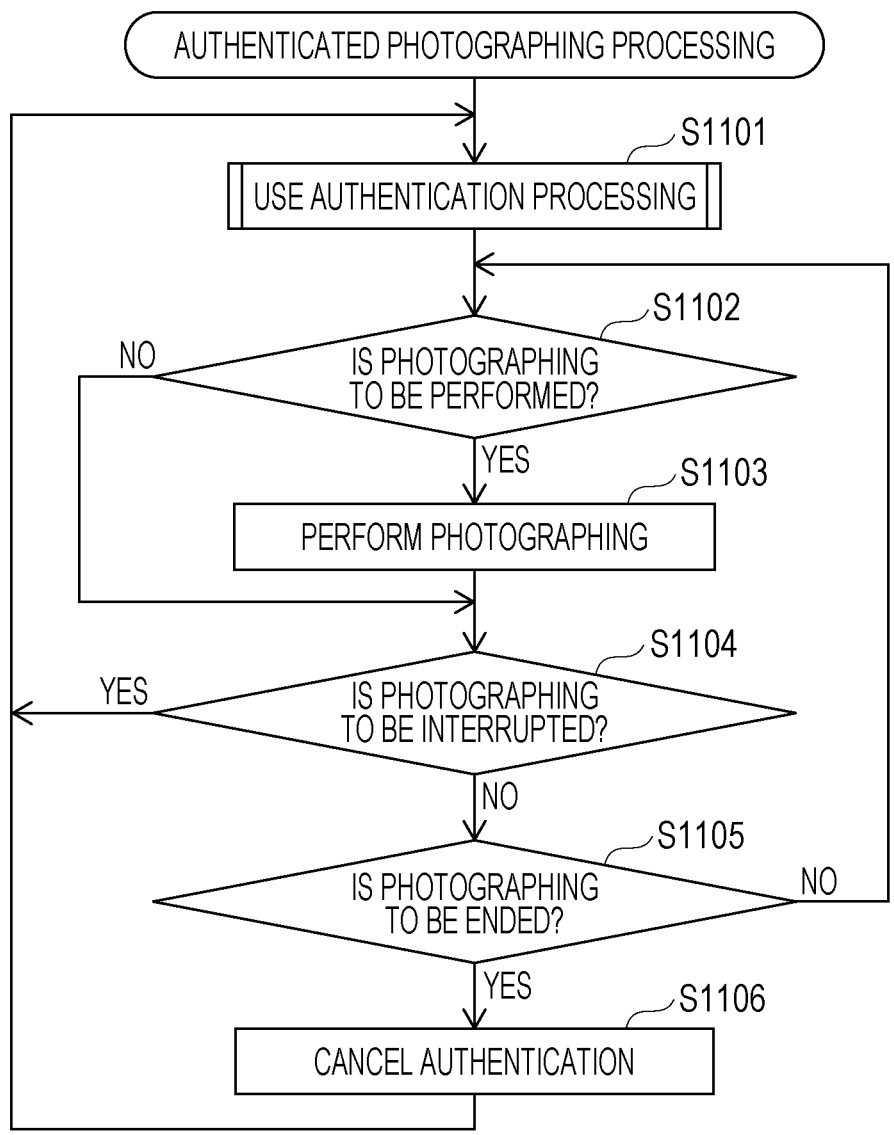
FIG. 11 is a flowchart illustrating an example of authenticated photographing processing.

FIG. 11 is a flowchart illustrating an example of procedures in authenticated photographing processing performed by the remote photographing system 2.

The remote photographing system 2 performs use authentication processing which will be described later to give photographing authority to the mobile terminal 14, and at the same time, sets a photographable range of the photographing camera 11 (step S1101).

When the use authentication processing is completed, a photographing controller 407 receives instructions from the mobile terminal 14 having been given the photographing authority through a communicator 404 (step S1102). The instructions from the mobile terminal 14 having been given the photographing authority include a photographing instruction, an acquisition instruction of a preview image, a photographing end instruction, a photographing interruption instruction, and the like. Furthermore, the instructions from the mobile terminal 14 having been given the photographing authority may include an instruction to perform a function of the photographing camera 11 such as panning, tilting, zooming, and focusing.

The photographing controller 407 controls the photographing camera 11 in accordance with the received instructions (step S1103). When the photographing controller 407 receives a photographing instruction, the photographing controller 407 controls the photographing camera 11 to acquire a still image and transmits the acquired still image to the mobile terminal 14 of the user through the communicator 404. When the photographing controller 407 receives an acquisition instruction of a preview image, the photographing controller 407 controls the photographing camera 11 to acquire a preview image (moving image or still image) and transmits the acquired preview image to the mobile terminal 14 of the user through the communicator 404.

Furthermore, when the photographing controller 407 receives an instruction to perform a function of the photographing camera 11, the photographing controller 407 controls the photographing camera 11 to perform the function such as panning, tilting, zooming, and focusing in accordance with the received instruction. It should be noted that the photographing controller 407 does not accept an instruction to change a photographing range of the photographing camera 11 to outside the photographable range set by the use authentication processing.

When the remote photographing system 2 has received a photographing interrupt instruction from the mobile terminal 14 having been given the photographing authority, the remote photographing system 2 returns to step S1101 to enable authentication of a photographing ID for another table (step S1104).

When the remote photographing system 2 has not received an instruction from the mobile terminal 14 having been given the photographing authority for a predetermined period of time (one second, for example), has completed the control of the photographing camera 11 in accordance with the received instruction, or has received a photographing end instruction, the remote photographing system 2 determines whether a photographing end condition is satisfied (step S1105).

In the present embodiment, the photographing end condition is that at least one of the following is satisfied: a photographing end instruction has been received from the mobile terminal 14 having been given the photographing authority; and a predetermined period of time has elapsed after the photographing authority is given to the mobile terminal 14. The time measured here may be the time that has elapsed after the first table is given the photographing authority, or the time that has elapsed after the last table is given the photographing authority.

The first and the last in this case means the first and the last in the order in which the mobile terminal 14 has acquired photographing authority with respect to a plurality of tables.

When the photographing end condition is satisfied, the photographing authority given to the mobile terminal 14 is canceled (step S1106). At this time, the user ID of the corresponding user is deleted from the authentication list which will be described later.

After the cancel of authentication, the processing returns to step S1101 to respond to the next start of use.

When the photographing end condition is not satisfied, the processing returns to step S1102.

The authenticated photographing processing performed by the remote photographing system 2 has been described above.

<2-3-2. Use Authentication Processing>

Use authentication processing performed by the remote photographing system 2 will next be described with reference to FIGS. 12 and 13A to 13E.

Figure 12:
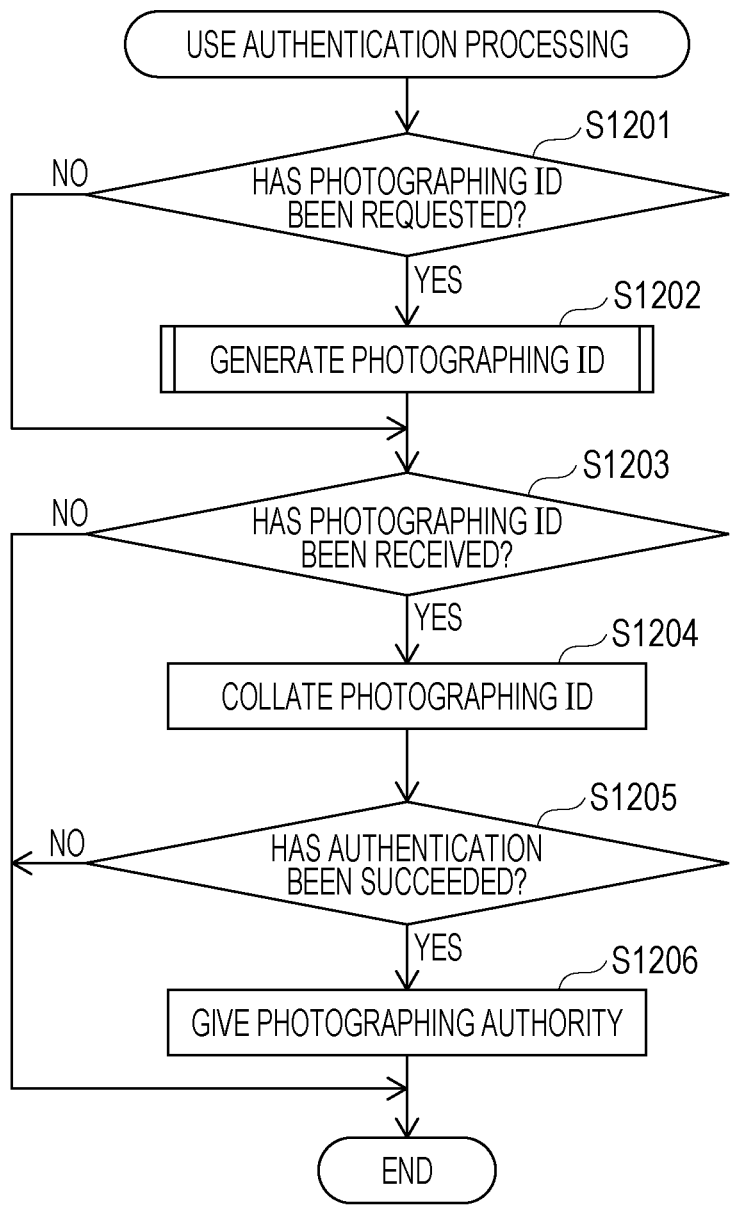
FIG. 12 is a flowchart illustrating an example of use authentication processing.

FIG. 12 is a flowchart illustrating an example of procedures of use authentication processing performed by the remote photographing system 2. Each of FIGS. 13A to 13E is a diagram illustrating an example of the authentication list managed by the server 15. As illustrated in FIGS. 13A to 13E, the authentication list is a database containing four attributes (columns) including a table ID, a camera ID, a photographing ID, and a user ID. In a table ID field, an identification number assigned to a table is registered. In a camera ID field, an identification number assigned to the photographing camera 11 that can perform photographing of a table having the corresponding record is registered. In a photographing ID field, a photographing ID issued for the table having the corresponding record is registered. In a user ID field, identification information for identifying the user having succeeded in authentication is registered. The user ID here is information such as cookie information of the browser and a device ID for the mobile terminal 14 owned by the user, for example.

The remote photographing system 2 has a configuration in which photographing of three tables 13 can be performed with one photographing camera 11 as an example. The number of records in the authentication list thus is three.

A state before the start of the use authentication processing, that is, a state at the time point in which none of the photographing ID issuers 12 of the tables 13 has issued a photographing ID and none of the users has succeeded in authentication of a photographing ID is as illustrated in FIG. 13A.

When the use authentication processing is started, the remote photographing system 2 waits until the user performs an operation of requesting one of the photographing ID issuers 12 to issue a photographing ID (step S1201).

When a photographing ID requester 402 receives the request to issue a new photographing ID, a photographing ID generator 403 performs photographing ID generation processing which will be described later and causes a photographing ID display 401 corresponding thereto to display the generated photographing ID (step S1202). The generated photographing ID is registered in a photographing ID field of the record of the corresponding table in the authentication list managed by the server 15. For example, it is assumed that the user performs an operation to request a photographing ID with respect to the photographing ID issuer 12 installed on the table the table ID of which is "T002". At this time, the generated photographing ID is displayed in a manner converted into a QR Code® on the photographing ID display 401 of the photographing ID issuer 12 installed on the table the table ID of which is "T002". Furthermore, as illustrated in FIG. 13B, in the record of the table the table ID of which is "T002" in the authentication list managed by the server 15, a character string for ID before being converted into a QR Code® is registered.

The remote photographing system 2 waits for a predetermined period of time until the photographing ID is received by a photographing ID receiver 405 through the communicator 404 (step S1203). The photographing ID receiver 405 acquires the photographing ID (access URL) from the user through the communicator 404 and forwards the character string for ID included in the URL to a photographing ID authenticator 406.

When the remote photographing system 2 has not received the photographing ID in the predetermined period of time, the remote photographing system 2 deletes the photographing ID registered in the authentication list at step S1202 to end the use authentication processing.

The photographing ID authenticator 406 sequentially collates character strings for ID received from the photographing ID receiver 405 with the photographing IDs registered in the authentication list (step S1204). Furthermore, the photographing ID authenticator 406 sequentially collates the user IDs for identifying the user as the transmission source of the photographing IDs received through the communicator 404 with the user IDs registered in the authentication list.

The photographing ID authenticator 406 determines whether the authentication of the photographing IDs has been succeeded in accordance with a collation result at step S1204 (step S1205).

When any of the photographing IDs registered in the authentication list has been found to be the same as any of the character strings for ID received from the photographing ID receiver 405 and no user ID other than the user as the transmission source of the photographing IDs is not registered among the user IDs registered in the authentication list, the photographing ID authenticator 406 determines that the authentication of the photographing IDs has been succeeded and proceeds to step S1206. By contrast, none of the photographing IDs registered in the authentication list has been found to be the same as any of the character strings for ID received from the photographing ID receiver 405 or a user ID other than the user as the transmission source of the photographing IDs is registered among the user IDs registered in the authentication list, the photographing ID authenticator 406 deletes the photographing IDs registered in the authentication list at step S1202 to end the use authentication processing.

When the authentication of the photographing ID has been succeeded, it is determined that the transmission source of the URL is present in the photographing spot in which the corresponding photographing ID issuer 12 is installed. The transmission source of the URL is thus given photographing authority for performing photographing using the photographing camera 11 (step S1206).

At this time, the photographable range of the photographing camera 11 is set in a manner including all of the tables 13 for which the authentication of the photographing IDs has been succeeded and excluding any of the tables 13 for which the authentication of the photographing IDs has not been succeeded. When only the table the table ID of which is "T002" is the table 13 for which the authentication of the photographing IDs has been succeeded, for example, the photographable range of the photographing camera 11 is set as in FIG. 8A. Furthermore, when only the tables the table IDs of which are "T001" and "T002" are the tables 13 for which the authentication of the photographing IDs has been succeeded, for example, the photographable range of the photographing camera 11 is set as in FIG. 8B.

At this time, the user ID of the user that has been authenticated is registered in a user ID field of the record of the corresponding table in the authentication list managed by the server 15. For example, it is assumed that the user the user ID of which is "U001" has succeeded in authentication of a photographing ID issued by the photographing ID issuer 12 installed on the table the table ID of which is "T002". "U001" is then registered in the record of the table ID "T002" in the authentication list managed by the server 15, as illustrated in FIG. 13C. The photographing ID used for the authentication is deleted from the authentication list to prevent the photographing ID from being doubly authenticated.

The use authentication processing performed by the remote photographing system 2 has been described above.

In a case where a user who has already succeeded in authentication of a photographing ID for one table performs an operation to request the photographing ID issuer 12 installed on another table 13 adjacent to the one table to issue a photographing ID, the same processing is performed. For example, it is assumed that the user the user ID of which is "U001" and who has succeeded in authentication of a photographing ID for the table the table ID of which is "T002" performs an operation to further request the photographing ID issuer 12 installed on the table the table ID of which is "T001" to issue a photographing ID. In this case, at step S1202, the photographing ID is registered as illustrated in FIG. 13D, for example. At step S1506, the user ID is registered as illustrated in FIG. 13E, for example.

<2-3-3. Photographing ID Generation Processing>

Photographing ID generation processing performed by the remote photographing system 2 will next be described.

Figure 14:
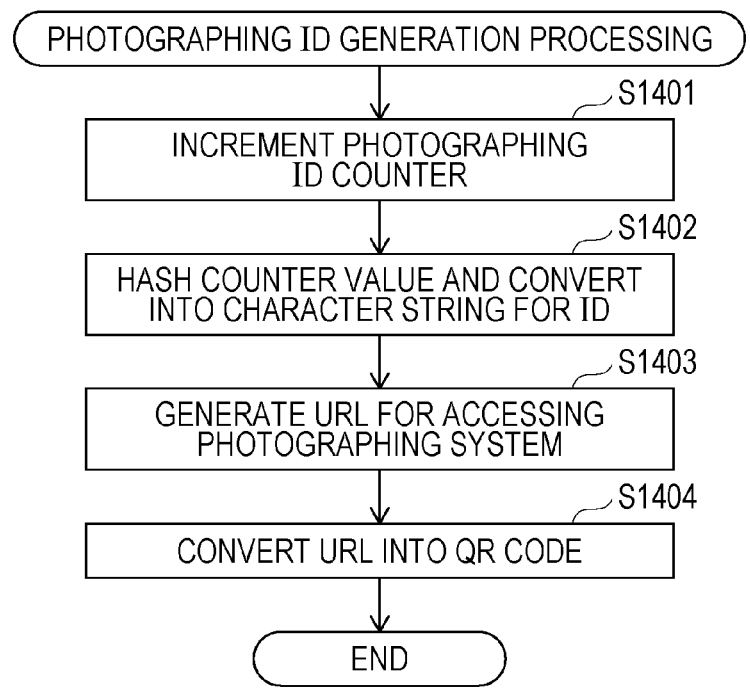
FIG. 14 is a flowchart illustrating an example of photographing ID generation processing.

FIG. 14 is a flowchart illustrating an example of photographing ID generation processing.

When the photographing ID generation processing is started, the photographing ID generator 403 increments a value of a photographing ID counter and acquires the incremented value of the photographing ID counter (step S1401). The photographing ID counter is set to an initial value (0, for example) at the time of initialization of the remote photographing system 2, and during the operation of the remote photographing system 2, incremented every time photographing ID generation processing is performed. To prevent the same photographing ID from being issued twice or more, a counter the bit number of which is sufficient for the number of photographing IDs requested to be issued during the operating lifetime of the system is prepared. For example, in a case where the request is accepted 990,000 times, a counter of 20 bits is required. In the remote photographing system 2, one photographing ID generator 403 is provided for a plurality of photographing ID issuers 12, and a value of the photographing ID counter is thus used instead of a current time, which is used in the remote photographing system 1. This configuration can prevent the same photographing ID from being issued even when photographing IDs are requested to the photographing ID issuers 12 installed on a plurality of tables 13 at exactly the same timing.

At step S1401, a value of "123456" is acquired for example, as illustrated in FIG. 15A.

A hash function is used to convert the acquired value into a character string for ID (step S1402). FIG. 15B is an example of a character string for ID converted using a hash function.

Next, a URL of a website of the remote photographing system 2 is generated in a manner including the character string for ID (step S1403). FIG. 15C is an example of an URL of a website of the remote photographing system 2. The part described as "camerasystem" in FIG. 15C is a host name of a web server of the remote photographing system 2. The character string of "e10adc3949ba59abbe56e057f20f883e" behind that part is the character string for ID described above.

Figure 15D:
FIG. 15D is a diagram explaining the photographing ID generation processing and illustrating a QR Code®.

Finally, the URL is converted into a QR Code® (step S1404). FIG. 15D is an example of a URL having been converted into a QR Code®.

The generated QR Code® is displayed on the photographing ID display 401 of the photographing ID issuer 12.

The photographing ID generation processing performed by the remote photographing system 2 has been described above.

<2-4. Effect>

According to the present embodiment, only when the user having the mobile terminal 14 can acquire the photographing ID from the photographing ID issuer 12 installed on the table 13 serving as the photographing spot, the user is considered as being present in the photographing spot, that is, the photographing range of the photographing camera 11 and given photographing authority. This also can prevent behaviors such as surreptitious photographing from a remote place, which is conducted by a third person who is not present in the photographing spot.

Furthermore, the present embodiment enables collective photographing of persons sitting at a plurality of tables.

<3. Variation>

Although two embodiments of the remote photographing systems according to the present disclosure have been described above, the exemplified remote photographing systems can be varied as described below. Furthermore, it is natural that the present disclosure is not limited to the remote photographing systems presented in the embodiments described above.

(1) In the embodiments described above, each of the remote photographing systems includes a photographing camera 11, a photographing ID issuer 12, and a server 15. However, the configuration of a remote photographing system according to the present disclosure is not limited thereto. For example, when the photographing camera 11 has a function of the server 15, no separate server 15 may be provided. Furthermore, when the remote photographing system has a configuration in which one photographing ID issuer 12 is provided for one photographing camera 11 as in the first embodiment and the photographing ID issuer 12 has a function of the server 15, no separate server 15 may be provided.

(2) In the embodiments described above, the photographing ID issuer 12 includes the photographing ID requester 402 and receives a request to issue a photographing ID from the user. However, the configuration of a remote photographing system according to the present disclosure is not limited thereto. When the remote photographing system includes an input device that receives a request to issue a photographing ID from the user and transmits the request to the photographing ID generator 403, the photographing ID issuer 12 may not include a photographing ID requester 402.

(3) In the embodiments described above, the photographing ID issuer 12 is presented in a form of a tablet installed on the table 13. However, the configuration of a remote photographing system according to the present disclosure is not limited thereto. For example, the photographing ID issuer 12 may be implemented in a form that the table 13 itself has a function of a tablet incorporated therein, in a form using a small-sized terminal such as a smartphone, in a form of a dedicated terminal with only a display and a button for requesting a photographing ID incorporated therein, and in a form of a dedicated terminal with a short-distance communication function and a button for requesting a photographing ID incorporated therein. Furthermore, the photographing ID issuer 12 may be incorporated in a terminal carried by a restaurant staff for taking an order, so that a table number (table ID) is input thereto to acquire a photographing ID.

(4) In the embodiments described above, the function of the photographing ID requester 402 is implemented with the icon displayed on the screen of the tablet touched, as illustrated in FIG. 2A. However, the configuration of a remote photographing system according to the present disclosure is not limited thereto. For example, an analog button may be installed so that pressing the button implements the function, or the function may be implemented in accordance with a request issued from outside the remote photographing system through the mobile terminal 14 of the user or other devices.

(5) In the embodiments described above, the photographing ID issuer 12 displays a photographing ID generated by the photographing ID generator 403 in a manner converted into a QR Code® and thereby issues the photographing ID to the user, as illustrated in FIG. 2B. However, the issuing method of the photographing ID generated by the photographing ID generator 403 according to the present disclosure is not limited thereto. For example, the photographing ID issuer 12 may be configured to cause the photographing ID display 401 thereof to display the photographing ID in a manner not converted into a QR Code™. Alternatively, the photographing ID issuer 12 may include a short-distance radio transmitter for performing short-distance radio communication with the mobile terminal 14 of the user and transmit the photographing ID from the short-distance radio transmitter to the mobile terminal 14 of the user, which has a short-distance radio receiver. Furthermore, the photographing ID issuer 12 may include an optical ID transmitter for transmitting an optical ID signal in which a digital signal is superimposed on blinking of an LED source and use the mechanism of an optical ID to issue the photographing ID to the mobile terminal 14 of the user.

(6) In the embodiments described above, a hash function is used for generation of a character string for ID in the photographing ID generation processing. However, the function used does not have to be a hash function and may be any one-way function.

(7) In the embodiments described above, in the photographing ID generation processing, a character string for a current time and a value of the photographing ID counter are hash-converted without any change thereto to generate a character string for ID. However, the hash conversion may be performed after a predetermined character string is connected to the character string or the value. For example, to the character string for a current time, the device ID of the photographing ID issuer 12 that has received a request to issue a photographing ID, a character string for the table ID of the table 13 installed thereon, or the like may be connected before the hash conversion. With this configuration, a different photographing ID may be generated for each table.

(8) In the photographing ID generation processing of the remote photographing system 2 according to the second embodiment described above, the photographing ID counter is incremented, that is, added with 1, whereby a different value is generated every time. However, as long as the condition that the same value is not generated for a plurality of times is satisfied, the photographing ID counter may be updated in such a manner that a value such as 2 or 3 (not 1), or a value randomly selected from 1 to 10 for each time may be added every time.

(9) When a plurality of tables are photographed by with one camera, the remote photographing system 2 according to the second embodiment is suitable. However, when a plurality of cameras are installed, a plurality of remote photographing systems 1 may be installed. Furthermore, the remote photographing system 1 and the remote photographing system 2 may be installed in combination.

Figures 16, 17:
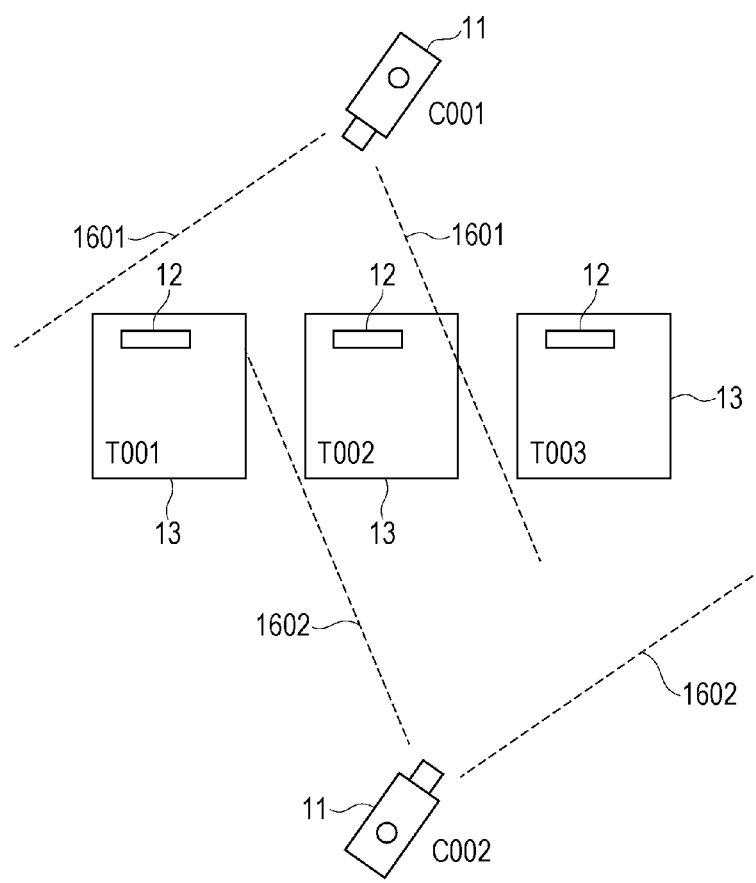
FIG. 16 is a diagram illustrating an example of a photographing range of a photographing camera.
FIG. 17 is a diagram illustrating an example of an authentication list.
Figure 18:
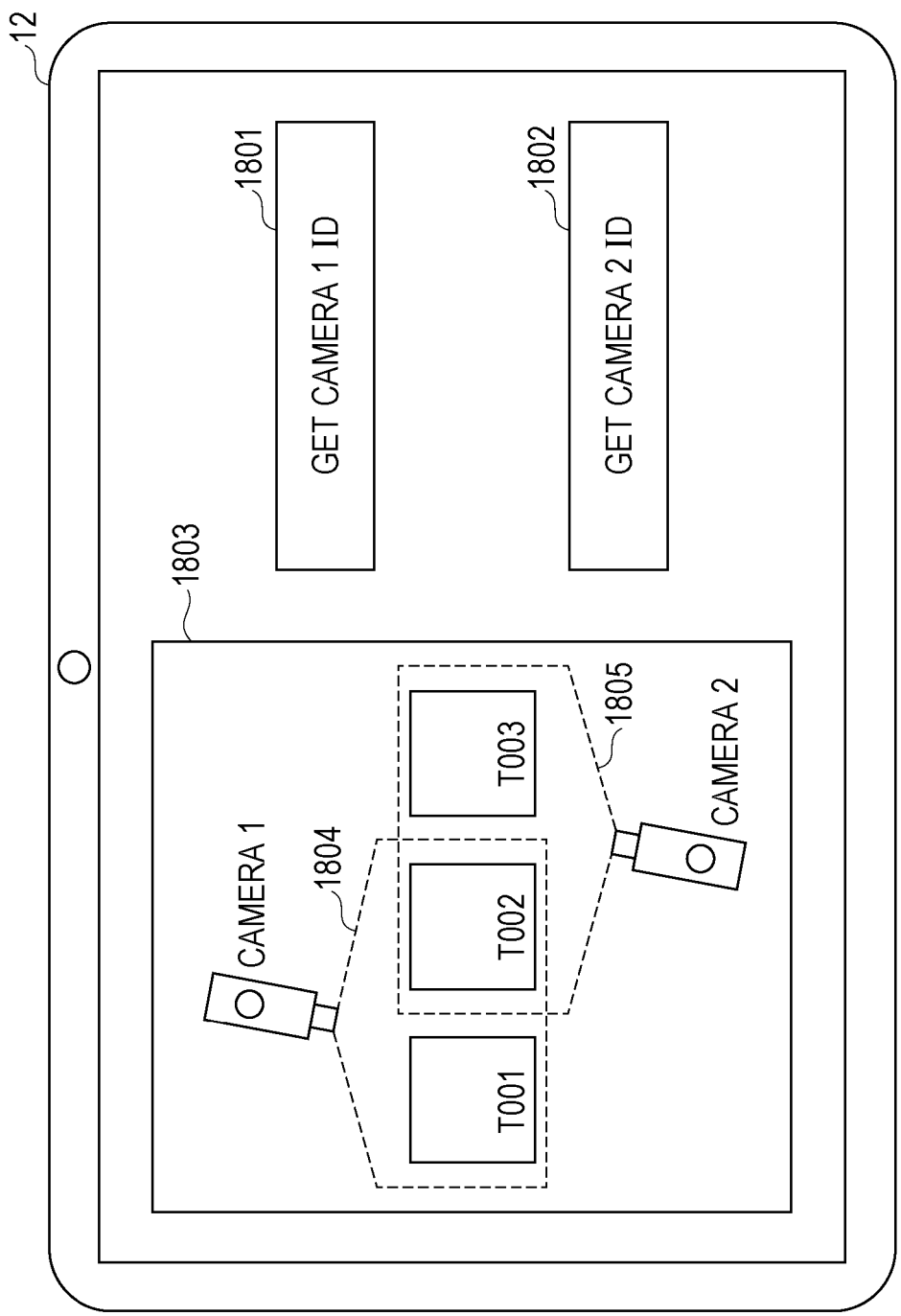
FIG. 18 is a diagram illustrating an example of a photographing guide screen of the photographing ID issuer.

For example, as illustrated in FIG. 16, a camera the camera ID of which is "C001" capable of photographing the tables the table IDs of which are "T001" and "T002" may be combined with a camera the camera ID of which is "C002" capable of photographing the tables the table IDs of which are "T002" and "T003" to be installed in combination. In this case, the table the table ID of which is "T002" can be photographed with both of the camera the camera ID of which is "C001" and the camera the camera ID of which is "C002". The authentication list managed by the server 15 thus has two records for the table ID of "T002", as illustrated in FIG. 17. In this case, with respect to each combination of a table ID and a camera ID, records for registering photographing IDs and user IDs may be determined. Furthermore, a variation may be made such that the user selects, at this time, which of the photographing cameras 11 is to be used. For example, as illustrated in FIG. 18, the icons 1801 and 1802 may be displayed on the photographing ID issuer 12 so that a photographing ID for acquiring photographing authority of the camera desired to be used is issued by touching thereon. For this occasion, as presented by a reference numeral 1803, an illustration arranged alongside to illustrate photographable ranges 1804 and 1805 of the photographing cameras 11 helps the user make an instinctive determination which of the photographing cameras 11 is to be used.

Figure 19A:
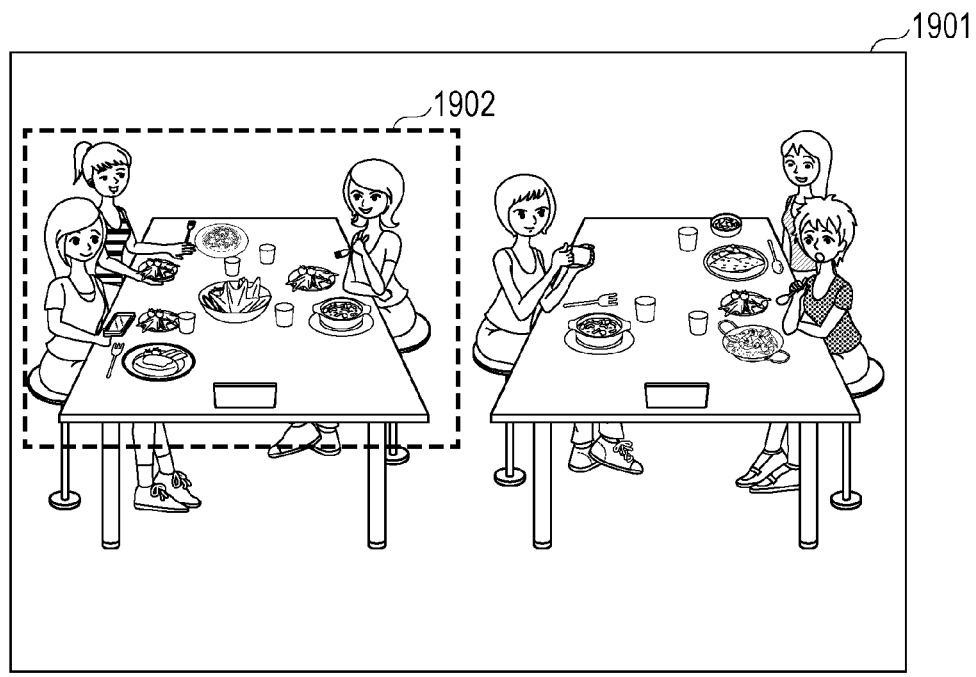
FIG. 19A is a diagram explaining an example of processing of changing a photographing range of the photographing camera and illustrating a whole view of a photographing image.
Figure 19B:
FIG. 19B is a diagram explaining an example of the processing of changing a photographing range of the photographing camera and illustrating the photographing image having been trimmed.

(10) In the embodiments described above, change of a photographing range is implemented by a function of the photographing camera 11 such as panning, tilting, and zooming. However, the changing method of a photographing range is not limited thereto. For example, the photographing camera 11 may be set so as to perform photographing always with a wide field angle, so that a part of the photographed image is trimmed before transmitted to the mobile terminal 14 of the user. An image 1901 in FIG. 19A represents a whole photographing image photographed with the photographing camera 11 and a dashed line 1902 represents a trimmed range therefrom. An image 1903 in FIG. 19B represents the trimmed photographing image. Thereafter, by changing the trimmed range, the photographing range viewed from the user may be changed.

Figure 20:
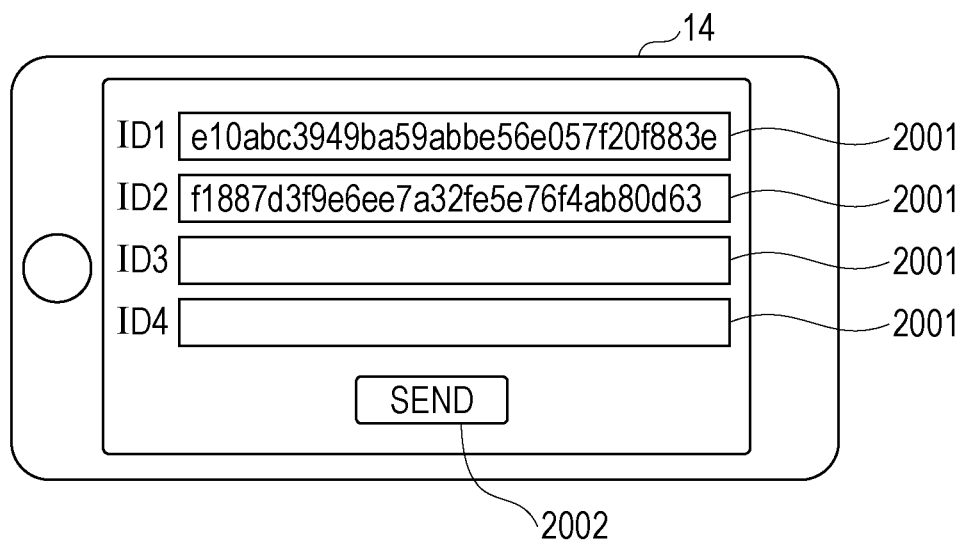
FIG. 20 is a diagram illustrating an example of a photographing ID input screen of a mobile terminal.

(11) In the embodiments described above, an access to the remote photographing system from the mobile terminal 14 of the user is performed with a web browser and the photographing ID is forwarded in a form of a URL. However, the method of forwarding the photographing ID from the mobile terminal 14 to the remote photographing system is not limited thereto. The mobile terminal 14 of the user may cause a dedicated application to be activated and cause a photographing ID input with the dedicated application to be transmitted to the remote photographing system. For example, when a range including a plurality of tables is desired to be photographed at the same time, as presented by reference numerals 2001 in FIG. 20, collective transmission of photographing IDs may be performed with a plurality of photographing IDs input on a screen of the dedicated application and a transmission button 2002 then touched. With this configuration, collective authentication of photographing IDs for a plurality of tables can be performed.

Figure 21A:
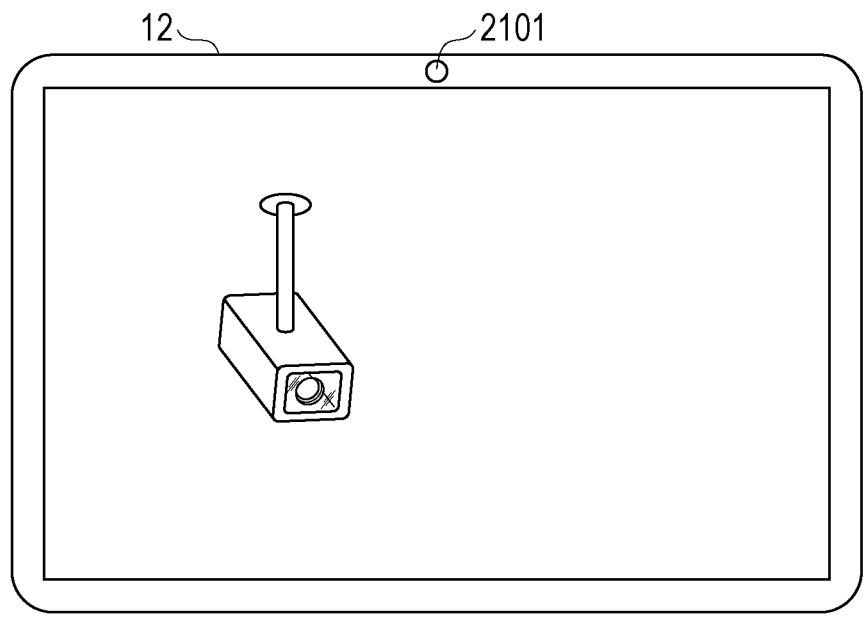
FIG. 21A is a diagram illustrating an example of a photographing guide screen.
Figure 21B:
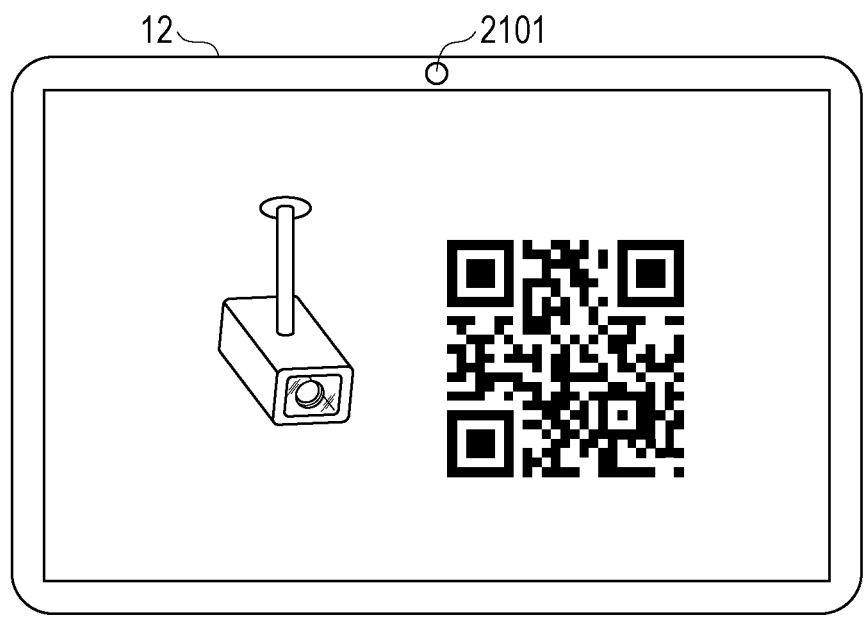
FIG. 21B is a diagram illustrating an example of a photographing ID screen.
Figure 22A:
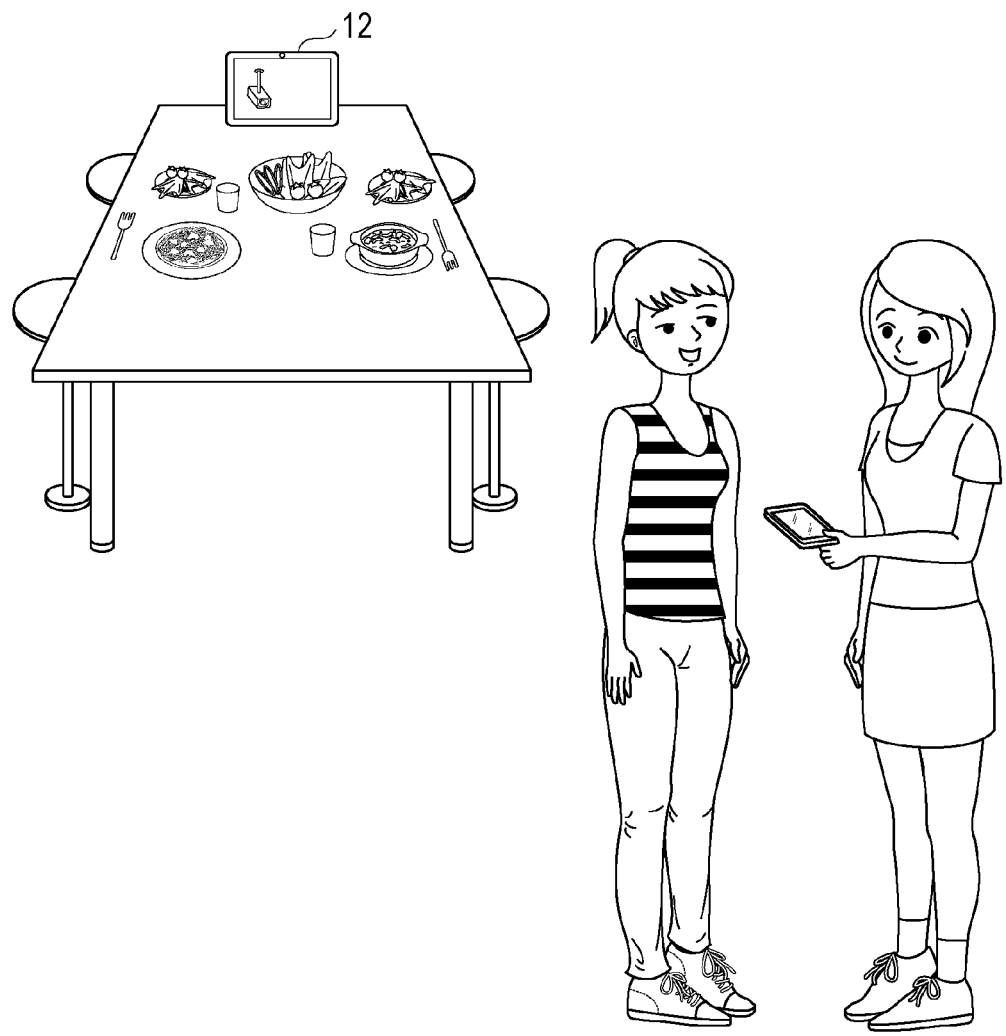
FIG. 22A is a diagram illustrating an example of a scene of using the remote photographing system and illustrating a state in which a user is away from the table.
Figure 22B:
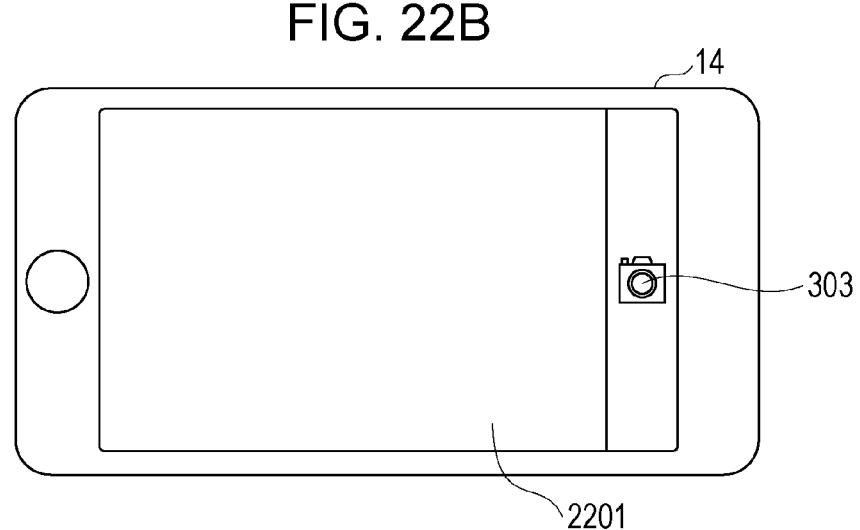
FIG. 22B is a diagram illustrating an example of a scene of using the remote photographing system and illustrating an example of screen display of the mobile terminal.
Figure 23A:
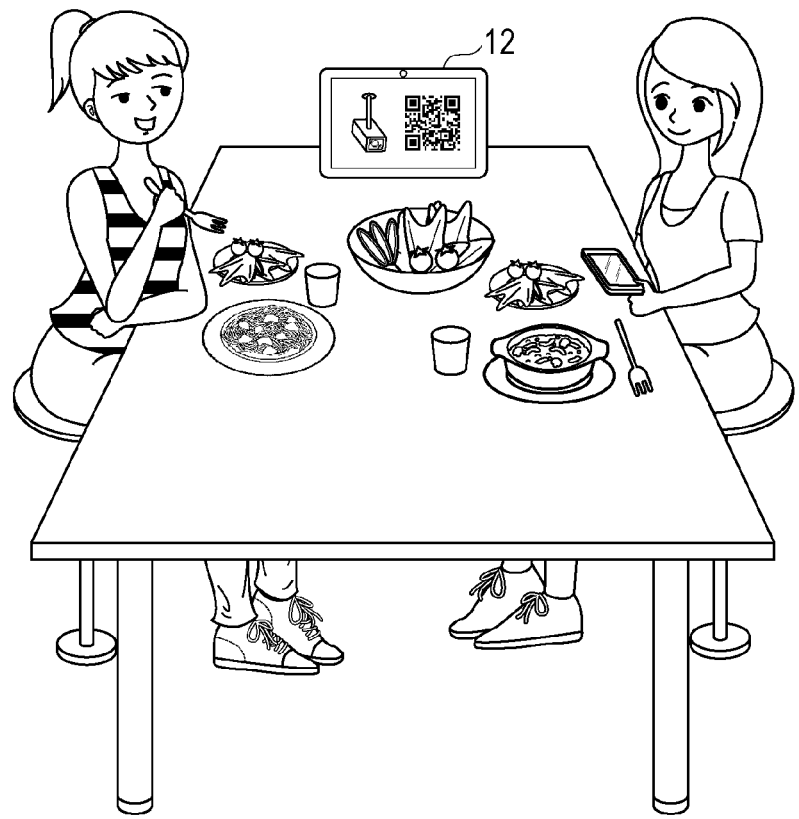
FIG. 23A is a diagram illustrating an example of a scene of using the remote photographing system and illustrating a state in which a user sits at the table.
Figure 23B:
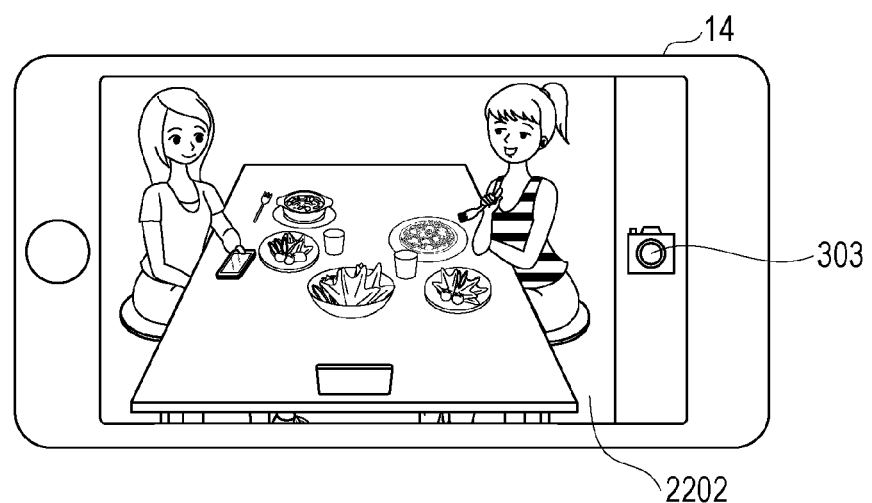
FIG. 23B is a diagram illustrating an example of a scene of using the remote photographing system and illustrating an example of screen display of the mobile terminal.

(12) In the embodiments described above, as illustrated in FIG. 2A, detection of a touch on the icon 201 displayed on the photographing ID issuer 12 is a trigger to start the photographing ID generation processing. However, the trigger to start the photographing ID generation is not limited thereto. The trigger to start the photographing ID generation may be implemented in any manner as long as a request to issue a photographing ID is transmitted to the photographing ID generator while the user is present in the photographing spot. For example, the photographing ID issuer 12 may include a proximity sensor, so that the photographing ID is issued when the proximity sensor detects that the user has sit at the table 13. FIG. 21A is an example of the photographing ID issuer 12 including a proximity sensor 2101. When the user is away from the table 13 as illustrated in FIG. 22A, the proximity sensor does not detect any person, and the photographing ID issuer 12 thus does not issue a photographing ID (see FIG. 21A). With this, authentication of a photographing ID cannot be performed, and the mobile terminal 14 of the user cannot operate the photographing camera 11 (see FIG. 22B). By contrast, when the user sits at the table 13 as illustrated in FIG. 23A, the proximity sensor 2101 detects a person, and a photographing ID is issued from the photographing ID issuer 12 (see FIG. 21B). Thereafter, the photographing ID issued by the photographing ID issuer 12 is read by the mobile terminal 14 of the user, so that the remote photographing system is accessed, whereby an operation of the photographing camera 11 using the mobile terminal 14 is enabled (see FIG. 23B).

(13) In the authenticated photographing processing according to the embodiments described above, one of the photographing end conditions for performing cancel of authentication is that a predetermined period of time has elapsed after the photographing authority is given to the mobile terminal 14. However, the condition may be that a predetermined period of time has elapsed after the photographing ID requester 402 has received the request from the user. Furthermore, as illustrated in FIGS. 21A and 21B, when a person detection device is provided for the remote photographing system to detect a person present in a photographing spot, one of the photographing end conditions for performing cancel of authentication may be that the person detection device does not detect a person any more.

Figure 24A:
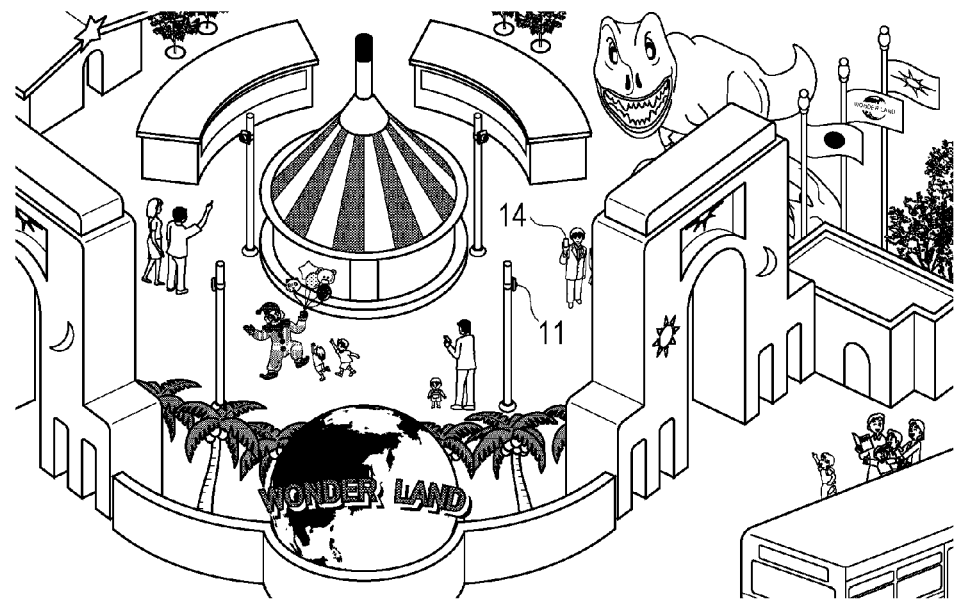
FIG. 24A is a diagram illustrating an example of a scene of using the remote photographing system.
Figure 24B:
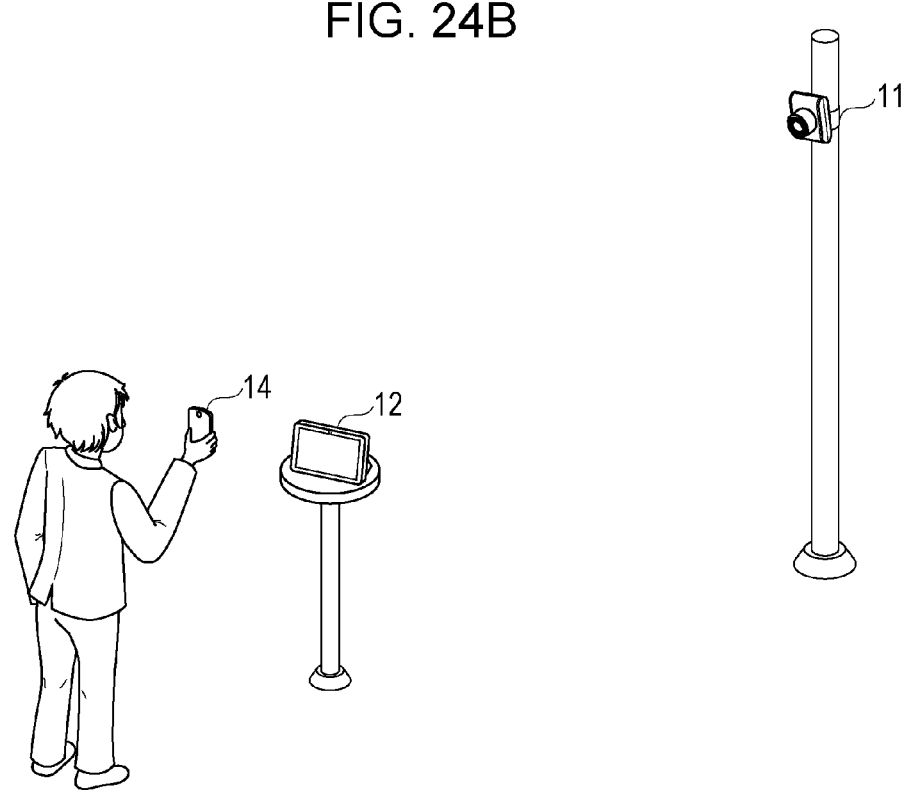
FIG. 24B is a diagram illustrating an example of a scene of using the remote photographing system.

(14) In the embodiments described above, examples have been described in which the remote photographing system is installed in a restaurant to perform photographing of a meal scene at the restaurant. However, as long as the photographing camera 11 and the photographing ID issuer 12 can be installed, the remote photographing system may be installed in any place. For example, as illustrated in FIGS. 24A and 24B, the remote photographing system may be installed in a theme park.

(15) A control program including a program code in machine language or high-level language causes each of the processing related to the photographing ID generator, the photographing ID receiver, the photographing ID authenticator, and the photographing controller and other processing presented in the embodiments described above to be executed by the processor of each of the above-described devices and various circuits connected to the processor. The control program may be recorded in a recording medium or distributed and circulated through various communication paths or the like. For this recording medium, an IC card, a hard disk, an optical disk, a flexible disk, a ROM, and a flash memory can be used, for example. The distributed and circulated control program is stored in a memory readable by the processor, for example, and thereby becomes usable. With the processor executing the control program, each function presented in each embodiment can be implemented. The processor may execute the control program directly, compile the control program and execute the compiled control program, or execute the control program using an interpreter.

(16) Each of the functional components presented in the embodiments described above (such as the photographing ID generator, the photographing ID receiver, the photographing ID authenticator, and the photographing controller) may be implemented as a circuit executing the function thereof, or may be implemented with one or a plurality of processors executing the corresponding program.

Each of the functional components described above typically is implemented as an LSI being an integrated circuit. Each of the functional components may be made into one chip individually, or a part or all of the components may be made into one chip. Although an LSI is herein assumed, the LSI may be referred to as an IC, a system LSI, a super LSI, and an ultra LSI, depending on the difference in the degree of integration. Furthermore, the method of circuit integration is not limited to using an LSI, and a dedicated circuit or a general purpose processor may be used. A field programmable gate array (FPGA), which is programmable after manufacturing of the LSI, or a reconfigurable processor, in which the connection and settings of circuit cells in the LSI are reconfigurable, may be used. Furthermore, when a technique of circuit integration replacing an LSI appears due to the progress of the semiconductor technology or another technology derived therefrom, the technique naturally may be used for integration of the functional block. Application of biotechnology, for example, is possible.

(17) Parts of the above-described embodiments and variations may be combined.

<4. Supplementation>

Supplementary explanation of the configuration and the effect according to the present embodiment will further be described below.

(A) A camera control method according to one aspect of the present disclosure is a camera control method used in a photographing system including an ID issuer installed in a photographing spot, a photographing camera installed toward the photographing spot, and a communicator for performing data communication with an external terminal. The camera control method includes generating a first photographing ID by receiving a request to issue a photographing ID, issuing the first photographing ID from the ID issuer, receiving a second photographing ID at the communicator, authenticating that a transmission source of the second photographing ID is present in the photographing spot when the first photographing ID is collated with the second photographing ID and the collated IDs are identical, and controlling the photographing camera in accordance with an instruction from the transmission source of the second photographing ID authenticated by the authenticating.

With the configuration described above, photographing using the photographing camera can be allowed only to a person who can know the photographing ID issued by the ID issuer installed in the photographing spot, that is, a user present in the photographing spot.

(B) A camera control method according to one aspect of the present disclosure is characterized by that, in the camera control method according to the aspect (A), the generating causes the first photographing ID to include a value generated by inputting a different value to a one-way function every time the request to issue a photographing ID is received.

This configuration enables use of a value that is different every time and cannot be easily guessed as a photographing ID. As a result, behaviors such as surreptitious photographing conducted by a third person who is not present in the photographing spot can be prevented.

(C) A camera control method according to one aspect of the present disclosure is characterized by that, in the camera control method according to the aspect (A), the generating causes the first photographing ID to be a URL.

With this configuration, a user who can know the photographing ID can easily access the system only by inputting the URL in an address field of a web browser that the user has.

(D) A camera control method according to one aspect of the present disclosure is characterized by that, in the camera control method according to the aspect (A), the ID issuer includes an input device and the generating receives the request to issue a photographing ID by detecting an input to the input device.

This configuration enables detection of the user's active action with respect to the input device as a request to issue a photographing ID.

(E) A camera control method according to one aspect of the present disclosure is characterized by that, in the camera control method according to the aspect (A), the ID issuer includes a proximity sensor and the generating receives the request to issue a photographing ID with the proximity sensor detecting approach of a person.

This configuration enables issuance of a photographing ID with no special action performed by the user present in a detection range of the proximity sensor (photographing spot).

(F) A camera control method according to one aspect of the present disclosure is characterized by that, in the camera control method according to the aspect (A), the generating receives the request to issue a photographing ID through the communicator.

With this configuration, the user can use his or her own mobile terminal to transmit a request to issue a photographing ID to the system, for example. The user also can transmit a request to issue a photographing ID from a terminal carried by a restaurant staff for taking an order to the system, for example.

(G) A camera control method according to one aspect of the present disclosure is characterized by that, in the camera control method according to the aspect (A), the ID issuer includes a display and the issuing causes the display to display the first photographing ID.

With this configuration, only the user who can see the display of the ID issuer installed in the photographing spot can acquire a photographing ID.

(H) A camera control method according to one aspect of the present disclosure is characterized by that, in the camera control method according to the aspect (G), the issuing converts the first photographing ID into a bar code and causes the display to display the bar code.

With this configuration, the user can acquire a photographing ID using a device including a function of reading bar-coded information.

(I) A camera control method according to one aspect of the present disclosure is characterized by that, in the camera control method according to the aspect (A), the ID issuer includes an optical ID transmitter and the issuing causes the optical ID transmitter to transmit the first photographing ID.

With this configuration, the user can acquire a photographing ID using a device having a function of reading an optical ID signal.

(J) A camera control method according to one aspect of the present disclosure is characterized by that, in the camera control method according to the aspect (A), the ID issuer includes a short-distance radio communicator and the issuing causes the short-distance radio communicator to transmit the first photographing ID.

With this configuration, the user can acquire a photographing ID using a device including a short-distance radio communication function.

(K) A camera control method according to one aspect of the present disclosure is characterized by that, in the camera control method according to the aspect (A), the authenticating is performed only when a time difference between a generation time of the first photographing ID and a reception time of the second photographing ID is within a predetermined period of time.

With this configuration, the user visiting the photographing spot can perform authentication of a photographing ID only within a time zone in which the user visits the photographing spot.

(L) A camera control method according to one aspect of the present disclosure is characterized by the features described below, in the camera control method according to the aspect (A). In the photographing system, an ID issuer is installed at each of a plurality of photographing spots. The camera control method further includes controlling a photographing range of the photographing camera.

The generating receives a request to issue a photographing ID with respect to the ID issuers and generates a plurality of first photographing IDs. The issuing issues each of the first photographing IDs from the ID issuer corresponding thereto. The receiving receives a plurality of second IDs from one transmission source. The authenticating collates the first photographing IDs with the second photographing IDs and, when any of the second photographing IDs identical with any of the first photographing IDs is present, authenticates that a transmission source of the second photographing ID is present in a photographing spot corresponding to the identical first photographing ID. The controlling the photographing range changes the photographing range of the photographing camera in a manner including all the photographing spots authenticated by the authenticating as having therein the transmission source of the second photographing ID.

With this configuration, photographing can be performed with a plurality of photographing spots included in a photographing range.

(M) A camera control method according to one aspect of the present disclosure is characterized by that, in the camera control method according to the aspect (L), the controlling the photographing range performs the change of the photographing range of the photographing camera in combination of panning, tilting, and zooming of the photographing camera.

This configuration enables change of a photographing range using a function included in the photographing camera (panning, tilting, and zooming).

(N) A camera control method according to one aspect of the present disclosure is characterized by that, in the camera control method according to the aspect (L), the controlling the photographing range performs the change of the photographing range of the photographing camera by cutting out a photographed image.

With this configuration, changing a trimmed range of the photographed image, even with a photographing camera that does not have a function of panning, tilting, zooming, and the like, can change an apparent photographing range of the photographed image received by the user.

(O) A camera control method according to one aspect of the present disclosure is characterized by that, in the camera control method according to the aspect (L), the photographing system includes a person detector that performs detection of a person in each photographing spot and the controlling the photographing range performs the change of the photographing range of the photographing camera in a manner not including any photographing spot with no person detected.

With this configuration, a photographing spot with no person detected can be excluded from photographing targets.

(P) A camera control method according to one aspect of the present disclosure is characterized by that, in the camera control method according to the aspect (A), the photographing system includes a person detector that performs detection of a person in each photographing spot. The camera control method further includes cancelling authentication for stopping receiving an instruction from the transmission source of the second photographing IDs authenticated by the authenticating when the person detector does not detect a person any more.

With this configuration, a person having left a photographing spot is prevented from conducting surreptitious photographing of a person visiting the photographing spot afterwards.

(Q) A camera control method according to one aspect of the present disclosure is characterized by that, in the camera control method according to the aspect (A), the camera control method further includes cancelling authentication for stopping receiving an instruction from the transmission source of the second photographing IDs authenticated by the authenticating when a predetermined period has elapsed from the reception time of the second photographing ID.

With this configuration, a person having left a photographing spot is prevented from conducting surreptitious photographing of a person visiting the photographing spot afterwards.

With the photographing camera control method according to the present disclosure, only a user present in a photographing spot can use a service of photographing using a camera installed in the photographing spot by using his or her own mobile terminal. The photographing camera control method according to the present disclosure thus is suitable as a system for taking a commemorative photograph in a place such as a tourist spot, a theme park, and a restaurant.

What is claimed is:

1. A camera control method used in a photographing system including an identification (ID) issuer installed in a photographing spot, a photographing camera installed toward the photographing spot, and a communicator for performing data communication with an external terminal, the camera control method comprising:
   generating a first photographing ID by receiving a request to issue a photographing ID;
   issuing the first photographing ID from the ID issuer;
   receiving a second photographing ID at the communicator;
   authenticating that a transmission source of the second photographing ID is present in the photographing spot when the first photographing ID is collated with the second photographing ID and the collated IDs are identical;
   controlling the photographing camera in accordance with an instruction from the transmission source of the second photographing ID authenticated by the authenticating; and
   controlling a photographing range of the photographing camera, wherein
   in the photographing system, the ID issuer is installed at each of a plurality of photographing spots,
   the generating receives the request to issue a photographing ID with respect to the ID issuers and generates a plurality of first photographing IDs,
   the issuing issues each of the first photographing IDs from the ID issuer corresponding thereto,
   the receiving receives a plurality of second IDs from one transmission source,
   the authenticating collates the first photographing IDs with the second photographing IDs and, when any of the second photographing IDs identical with any of the first photographing IDs is present, authenticates that a transmission source of the second photographing ID is present in a photographing spot corresponding to the identical first photographing ID, and
   the controlling the photographing range to change the photographing range of the photographing camera in a manner including all of the photographing spots authenticated by the authenticating as having therein the transmission source of the second photographing ID.

2. The camera control method according to claim 1, wherein
   the generating causes the first photographing ID to include a value generated by inputting a different value to a one-way function every time the request to issue a photographing ID is received.

3. The camera control method according to claim 1, wherein
   the generating causes the first photographing ID to be a uniform resource locator.

4. The camera control method according to claim 1, wherein
   the ID issuer includes an input device, and
   the generating receives the request to issue a photographing ID by detecting an input to the input device.

5. The camera control method according to claim 1, wherein
   the ID issuer includes a proximity sensor, and
   the generating receives the request to issue a photographing ID with the proximity sensor detecting approach of a person.

6. The camera control method according to claim 1, wherein
   the generating receives the request to issue a photographing ID through the communicator.

7. The camera control method according to claim 1, wherein
   the ID issuer includes a display, and
   the issuing causes the display to display the first photographing ID.

8. The camera control method according to claim 7, wherein
   the issuing converts the first photographing ID into a bar code and causes the display to display the bar code.

9. The camera control method according to claim 1, wherein
   the ID issuer includes an optical ID transmitter, and
   the issuing causes the optical ID transmitter to transmit the first photographing ID.

10. The camera control method according to claim 1, wherein
    the ID issuer includes a short-distance radio communicator, and
    the issuing causes the short-distance radio communicator to transmit the first photographing ID.

11. The camera control method according to claim 1, wherein
    the authenticating is performed only when a time difference between a generation time of the first photographing ID and a reception time of the second photographing ID is within a predetermined period of time.

12. The camera control method according to claim 1, wherein
    the controlling the photographing range performs the change of the photographing range of the photographing camera in combination of panning, tilting, and zooming of the photographing camera.

13. The camera control method according to claim 1, wherein
the controlling the photographing range performs the change of the photographing range of the photographing camera by cutting out a photographed image.

14. The camera control method according to claim 1, wherein
the photographing system includes a person detector that performs detection of a person in each photographing spot, and
the controlling the photographing range performs the change of the photographing range of the photographing camera in a manner not including any photographing spot with no person detected.

15. The camera control method according to claim 1 further comprising:
cancelling authentication for stopping receiving an instruction from the transmission source of the second photographing IDs authenticated by the authenticating when a person detector does not detect a person any more, wherein
the photographing system includes the person detector that performs detection of a person in each photographing spot.

16. The camera control method according to claim 1, further comprising:
cancelling authentication for stopping receiving an instruction from the transmission source of the second photographing IDs authenticated by the authenticating when a predetermined period has elapsed from the reception time of the second photographing ID.

17. The camera control method according to claim 1, further comprising:
inputting a photographing ID to a mobile terminal owned by the user, and
transmitting the photographing ID inputted to the mobile terminal owned by the user to the communicator as the second photographing ID.

18. The camera control method according to claim 17, wherein
the inputting inputs the photographing ID as an address of a web browser of the mobile terminal.

19. The camera control method according to claim 17, wherein
the ID issuer includes a display for displaying the first photographing ID,
the mobile terminal includes a terminal camera, and
the inputting inputs the photographing ID by photographing an image of the first photographing ID displayed on the display using the terminal camera and reading the photographing ID from the photographed image.

20. The camera control method according to claim 17, wherein
the ID issuer includes a short-distance radio transmitter that transmits the first photographing ID,
the mobile terminal includes a short-distance radio receiver, and
the inputting inputs a photographing ID by receiving the first photographing ID transmitted from the short-distance radio transmitter with the short-distance radio receiver.

21. A camera control system comprising:
a photographing camera installed toward a photographing spot;
an identification (ID) generator that receives a request to issue a photographing ID and generates a first photographing ID;
an ID issuer that is installed at the photographing spot and issues the first photographing ID;
an ID receiver that performs data communication with an external terminal and receives a second photographing ID;
an ID authenticator that authenticates that a transmission source of the second photographing ID is present in the photographing spot when the first photographing ID is collated with the second photographing ID and the collated IDs are identical; and
a photographing controller that controls the photographing camera in accordance with an instruction from the transmission source of the second photographing ID authenticated by the ID authenticator, and controls a photographing range of the photographing camera, wherein
the ID issuer is installed at each of a plurality of photographing spots,
the ID generator receives the request to issue a photographing ID with respect to the ID issuers and generates a plurality of first photographing IDs,
each of the ID issuers issues the first photographing ID corresponding thereto,
the ID receiver receives a plurality of second IDs from one transmission source,
the ID authenticator collates the first photographing IDs with the second photographing IDs and, when any of the second photographing IDs identical with any of the first photographing IDs is present, authenticates that a transmission source of the second photographing ID is present in a photographing spot corresponding to the identical first photographing ID, and
the photographing controller changes the photographing range of the photographing camera in a manner including all the photographing spots authenticated by the authenticating as having therein the transmission source of the second photographing ID.

22. A camera control server used in a photographing system including an identification (ID) issuer installed in a photographing spot, a photographing camera installed toward the photographing spot, and a communicator for performing data communication with an external terminal, the camera control server comprising:
an ID generator that receives a request to issue a photographing ID and generates a first photographing ID to cause the ID issuer to issue the generated first photographing ID;
an ID receiver that performs data communication with an external terminal and receives a second photographing ID;
an ID authenticator that authenticates that a transmission source of the second photographing ID is present in the photographing spot when the first photographing ID is collated with the second photographing ID and the collated IDs are identical; and
a photographing controller that controls the photographing camera in accordance with an instruction from the transmission source of the second photographing ID authenticated by the ID authenticator, and controls a photographing range of the photographing camera, wherein
in the photographing system, the ID issuer is installed at each of a plurality of photographing spots,
the ID generator receives the request to issue a photographing ID with respect to the ID issuers and generates a plurality of first photographing IDs, each of the ID issuers issues the first photographing ID corresponding thereto, the ID receiver receives a plurality of second IDs from one transmission source, the ID authenticator collates the first photographing IDs with the second photographing IDs and, when any of the second photographing IDs identical with any of the first photographing IDs is present, authenticates that a transmission source of the second photographing ID is present in a photographing spot corresponding to the identical first photographing ID, and the photographing controller changes the photographing range of the photographing camera in a manner including all the photographing spots authenticated by the authenticating as having therein the transmission source of the second photographing ID.

* * * * *